(12) United States Patent
Arakita et al.

(10) Patent No.: US 9,426,443 B2
(45) Date of Patent: Aug. 23, 2016

(54) IMAGE PROCESSING SYSTEM, TERMINAL DEVICE, AND IMAGE PROCESSING METHOD

(75) Inventors: Kazumasa Arakita, Nasushiobara (JP); Shinsuke Tsukagoshi, Nasushiobara (JP); Tatsuo Maeda, Nasushiobara (JP); Takumi Hara, Akishima (JP); Kenta Moriyasu, Nasushiobara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 369 days.

(21) Appl. No.: 13/534,357

(22) Filed: Jun. 27, 2012

(65) Prior Publication Data

US 2012/0327080 A1 Dec. 27, 2012

(30) Foreign Application Priority Data

Jun. 27, 2011 (JP) ................................. 2011-142227

(51) Int. Cl.
*H04N 13/00* (2006.01)
*G06T 19/00* (2011.01)

(52) U.S. Cl.
CPC ............ *H04N 13/0014* (2013.01); *G06T 19/00* (2013.01); *G06T 2210/41* (2013.01); *G09G 2300/023* (2013.01); *G09G 2340/045* (2013.01); *G09G 2340/0457* (2013.01); *G09G 2340/10* (2013.01); *G09G 2354/00* (2013.01); *G09G 2380/08* (2013.01)

(58) Field of Classification Search
None
See application file for complete search history.

(56) References Cited

U.S. PATENT DOCUMENTS

| | | | |
|---|---|---|---|
| 6,931,596 B2* | 8/2005 | Gutta et al. | 715/728 |
| 6,975,755 B1* | 12/2005 | Baumberg | 382/154 |
| 7,338,449 B2* | 3/2008 | Gueck et al. | 600/447 |
| 7,570,275 B2* | 8/2009 | Idesawa et al. | 345/684 |
| 2007/0236514 A1* | 10/2007 | Agusanto et al. | 345/646 |
| 2008/0204453 A1* | 8/2008 | Katano | 345/420 |
| 2010/0045783 A1* | 2/2010 | State et al. | 348/53 |
| 2010/0253766 A1* | 10/2010 | Mann et al. | 348/51 |
| 2011/0110576 A1* | 5/2011 | Kreeger et al. | 382/132 |
| 2011/0241976 A1* | 10/2011 | Boger et al. | 345/8 |
| 2011/0304699 A1* | 12/2011 | Ito | A63F 13/10 348/47 |

FOREIGN PATENT DOCUMENTS

| | | |
|---|---|---|
| CN | 101351156 A | 1/2009 |
| JP | 09-084000 A | 3/1997 |
| JP | 09-173352 A | 7/1997 |
| JP | 2002-101428 A | 4/2002 |
| JP | 2005-86414 | 3/2005 |

OTHER PUBLICATIONS

Chinese Office Action issued Sep. 2, 2014, in China Patent Application No. 201210217105.3.
Office Action issued in corresponding Japanese Patent Application No. 2011-142227 mailed Apr. 21, 2015.
Hongen Liao, et al., "Building a Surgery Support Environment with a Three-dimensional Medical Image Including Operator's New Eyes: Integral Videography (IV)," Japan Industrial Publishing Co., Ltd. Jun. 1, 2005 (9 pages).

* cited by examiner

*Primary Examiner* — Xiao M. Wu
*Assistant Examiner* — Steven Elbinger
(74) *Attorney, Agent, or Firm* — Oblon, McClelland, Maier & Maier, L.L.P.

(57) ABSTRACT

An image processing system according to an embodiment is an image processing system having a terminal device including a display unit that displays a medical image. The image processing system includes an acquiring unit and a display controller. The acquiring unit acquires a position of the terminal device relative to a predetermined target. The display controller causes the display unit to display a medical image in accordance with the relative position of the terminal device relative to the target acquired by the acquiring unit.

9 Claims, 20 Drawing Sheets

IMAGE PROCESSING SYSTEM, TERMINAL DEVICE, AND IMAGE PROCESSING METHOD

CROSS-REFERENCE TO RELATED APPLICATIONS

This application is based upon and claims the benefit of priority from Japanese Patent Application No. 2011-142227, filed on Jun. 27, 2011; the entire contents of which are incorporated herein by reference.

FIELD

Embodiments described herein relate generally to an image processing system, a terminal device, and an image processing method.

BACKGROUND

In the past, there has been known a technique of causing two parallax images, captured from two points of view, to be displayed on a monitor so that a user who uses a dedicated device such as stereoscopic view glasses can view a stereoscopic image. Further, in recent years, there has been developed a technique of causing multiple parallax images (for example, nine parallax images), captured from a plurality of points of view, to be displayed on a monitor using a light beam controller such as a lenticular lens so that the user can view a stereoscopic image with the naked eyes. A plurality of images to be displayed on a monitor that can be viewed stereoscopically are generated by estimating depth information of an image shot from one viewpoint and performing image processing using the estimated information in some cases.

As medical image diagnostic devices such as X-ray computed tomography (CT) devices, magnetic resonance imaging (MRI) devices, and ultrasonography devices, devices that can generate three-dimensional (3D) medical image data (hereinafter, volume data) have been put into practice. Such a medical image diagnostic device generates a flat image for display by executing various pieces of image processing on volume data and displays the generated flat image on a general-purpose monitor. For example, the medical image diagnostic device executes volume rendering processing on volume data so as to generate a two-dimensional rendering image on which three-dimensional information for a subject has been reflected, and displays the generated rendering image on the general-purpose monitor.

DETAILED DESCRIPTION

An image processing system according to an embodiment is an image processing system having a terminal device including a display unit that displays a medical image. The image processing system includes an acquiring unit, and a display controller. The acquiring unit acquires a position of the terminal device relative to a predetermined target. The display controller causes the display unit to display a medical image in accordance with the relative position of the terminal device relative to the target that has been acquired by the acquiring unit.

Hereinafter, embodiments of the image processing system, the terminal device, and a method are described in detail with reference to accompanying drawings. In the following, an image processing system including a workstation with a function as an image processing apparatus is described as an embodiment. Here, the terminology used in the following embodiments is described. A "parallax image group" refers to an image group which is generated by performing a volume rendering process on volume data while moving a point-of-view position by a predetermined parallactic angle at a time. In other words, the "parallax image group" is configured with a plurality of "parallax images" having different "point-of-view positions." Further, a "parallactic angle" refers to an angle determined by an adjacent point-of-view position among point-of-view positions set to generate the "parallax image group" and a predetermined position in a space (the center of a space) represented by volume data. Further, a "parallax number" refers to the number of "parallax images" necessary to implement a stereoscopic view by a stereoscopic display monitor. Further, a "nine-parallax image" described in the following refers to a "parallax image group" consisting of nine "parallax images." Furthermore, a "two-parallax image" described in the following refers to a "parallax image group" consisting of two "parallax images."

First Embodiment

Figure 1:
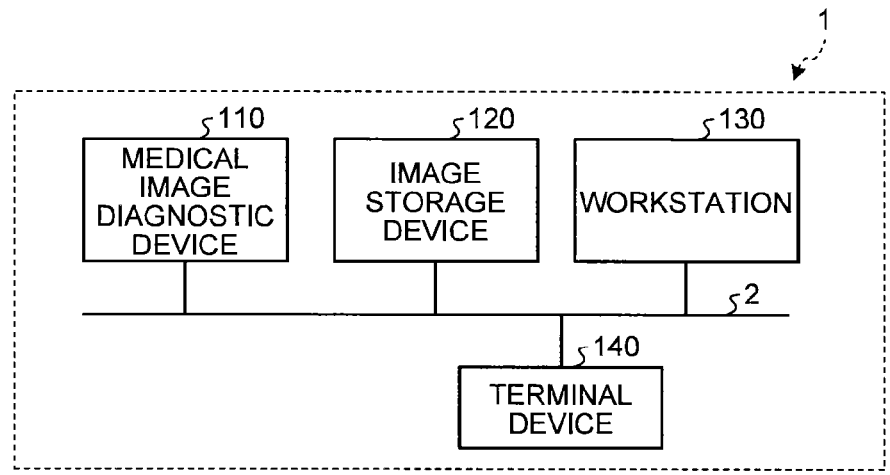
FIG. 1 is a diagram for explaining a configuration example of an image processing system according to a first embodiment.

First, a configuration example of an image processing system according to a first embodiment will be described. FIG. 1 is a diagram for describing a configuration example of an image processing system according to the first embodiment.

As illustrated in FIG. 1, an image processing system 1 according to the first embodiment includes a medical image diagnostic device 110, an image storage device 120, a workstation 130, and a terminal device 140. The respective devices illustrated in FIG. 1 are connected to directly or indirectly communicate one another, for example, via a hospital Local Area Network (LAN) 2 installed in a hospital. For example, when a Picture Archiving and Communication System (PACS) is introduced into the image processing system 1, the respective devices exchange a medical image or the like with one another according to a Digital Imaging and Communications in Medicine (DICOM) standard.

The image processing system 1 provides an observer, who works in the hospital such as a doctor or a laboratory technician, with a stereoscopic image which is an image stereoscopically viewable to the observer by generating a parallax image group based on volume data which is 3D medical image data generated by the medical image diagnostic device 110 and then causing the parallax image group to be displayed on a monitor with a stereoscopic view function. Specifically, in the first embodiment, the workstation 130 performs a variety of image processing on volume data and generates a parallax image group. Each of the workstation 130 and the terminal device 140 includes a monitor with a stereoscopic view function, and displays a stereoscopic image to a user by displaying the parallax image group generated by the workstation 130 through the monitor. The image storage device 120 stores volume data generated by the medical image diagnostic device 110 and the parallax image group generated by the workstation 130. For example, the workstation 130 or the terminal device 140 acquires the volume data or the parallax image group from the image storage device 120, executes arbitrary image processing on the acquired volume data or the acquired parallax image group, and causes the parallax image group to be displayed on the monitor. The respective devices will be described below in order.

The medical image diagnostic device 110 is an X-ray diagnostic device, an X-ray Computed Tomography (CT) device, a Magnetic Resonance Imaging (MRI) device, an ultrasonic diagnostic device, a Single Photon Emission Computed Tomography (SPECT) device, a Positron Emission computed Tomography (PET) device, a SPECT-CT device in which a SPECT device is integrated with an X-ray CT device, a PET-CT device in which a PET device is integrated with an X-ray CT device, a device group thereof, or the like. The medical image diagnostic device 110 according to the first embodiment can generate 3D medical image data (volume data).

Specifically, the medical image diagnostic device 110 according to the first embodiment captures a subject, and generates volume data. For example, the medical image diagnostic device 110 generates volume data such that it collects data such as projection data or an MR signal by capturing a subject, and then reconstructs medical image data including a plurality of axial planes along a body axis direction of a subject based on the collected data. For example, when the medical image diagnostic device 110 reconstructs medical image data of 500 axial planes, a medical image data group of 500 axial planes is used as volume data. Alternatively, projection data or an MR signal of a subject captured by the medical image diagnostic device 110 may be used as volume data.

The medical image diagnostic device 110 according to the first embodiment transmits the generated volume data to the image storage device 120. When the medical image diagnostic device 110 transmits the volume data to the image storage device 120, the medical image diagnostic device 110 transmits supplementary information such as a patient ID identifying a patient, an inspection ID identifying an inspection, a device ID identifying the medical image diagnostic device 110, and a series ID identifying single shooting by the medical image diagnostic device 110, for example.

The image storage device 120 is a database that stores a medical image. Specifically, the image storage device 120 according to the first embodiment receives the volume data from the medical image diagnostic device 110, and stores the received volume data in a predetermined storage unit. Further, in the first embodiment, the workstation 130 generates a parallax image group based on the volume data, and transmits the generated parallax image group to the image storage device 120. Thus, the image storage device 120 stores the parallax image group transmitted from the workstation 130 in a predetermined storage unit. Further, in the present embodiment, the workstation 130 capable of storing a large amount of images may be used, and in this case, the image storage device 120 illustrated in FIG. 1 may be incorporated with the workstation 130 illustrated in FIG. 1. In other words, in the present embodiment, the volume data or the parallax image group may be stored in the workstation 130.

Further, in the first embodiment, the volume data or the parallax image group stored in the image storage device 120 is stored in association with the patient ID, the inspection ID, the device ID, the series ID, and the like. Thus, the workstation 130 or the terminal device 140 performs a search using the patient ID, the inspection ID, the device ID, the series ID, or the like, and acquires necessary volume data or a necessary parallax image group from the image storage device 120.

The workstation 130 is an image processing apparatus that performs image processing on a medical image. Specifically, the workstation 130 according to the first embodiment performs various rendering processes on the volume data acquired from the image storage device 120, and generates a parallax image group.

Further, the workstation 130 according to the first embodiment includes a monitor (which is referred to as a "stereoscopic display monitor" or "stereoscopic image display device") capable of displaying a stereoscopic image as a display unit. The workstation 130 generates a parallax image group and causes the generated parallax image group to be displayed on the stereoscopic display monitor. Thus, an operator of the workstation 130 can perform an operation of generating a parallax image group while checking a stereoscopically viewable stereoscopic image displayed on the stereoscopic display monitor.

Further, the workstation 130 transmits the generated parallax image group to the image storage device 120 or the terminal device 140. The workstation 130 transmits the supplementary information such as the patient ID, the inspection ID, the device ID, and the series ID, for example, when transmitting the parallax image group to the image storage device 120 or the terminal device 140. As supplementary information transmitted when the parallax image group is transmitted to the image storage device 120, supplementary information related to the parallax image group is further included. Examples of the supplementary information related to the parallax image group include the number of parallax images (for example, "9") and the resolution of a parallax image (for example, "466×350 pixels."

The terminal device 140 is a device that allows a doctor or a laboratory technician who works in the hospital to view a medical image. Examples of the terminal device 140 include a Personal Computer (PC), a tablet-type PC, a Personal Digital Assistant (PDA), and a portable telephone, which are operated by a doctor or a laboratory technician who works in the hospital. Specifically, the terminal device 140 according to the first embodiment includes a stereoscopic display monitor as a display unit. Further, the terminal device 140 acquires a parallax image group from the image storage device 120 or the workstation 130, and causes the acquired parallax image group to be displayed on the stereoscopic display monitor. As a result, a doctor or a laboratory technician who is an observer can view a stereoscopically viewable medical image. Alternatively, the terminal device 140 may be an arbitrary information processing terminal connected with a stereoscopic display monitor as an external device.

Here, the stereoscopic display monitor included in the workstation 130 or the terminal device 140 will be described. A general-purpose monitor which is currently most widely used two dimensionally displays a two-dimensional (2D) image and hardly performs a 3D display on a 2D image. If an observer desires a stereoscopic view to be displayed on the general-purpose monitor, a device that outputs an image to the general-purpose monitor needs to parallel-display a two-parallax image stereoscopically viewable to an observer through a parallel method or an intersection method. Alternatively, a device that outputs an image to the general-purpose monitor needs to display an image stereoscopically viewable to an observer through a color-complementation method using glasses in which a red cellophane is attached to a left-eye portion and a blue cellophane is attached to a right-eye portion.

Meanwhile, there are stereoscopic display monitors that allow a two-parallax image (which is also referred to as a "binocular parallax image") to be stereoscopically viewed using a dedicated device such as stereoscopic glasses.

Figure 2A:
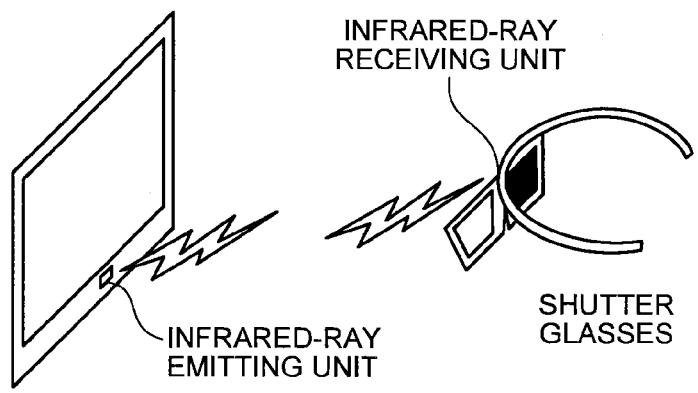
FIG. 2A and FIG. 2B are views for explaining an example of a stereoscopic display monitor on which stereoscopic display is performed with two parallax images.
Figure 2B:
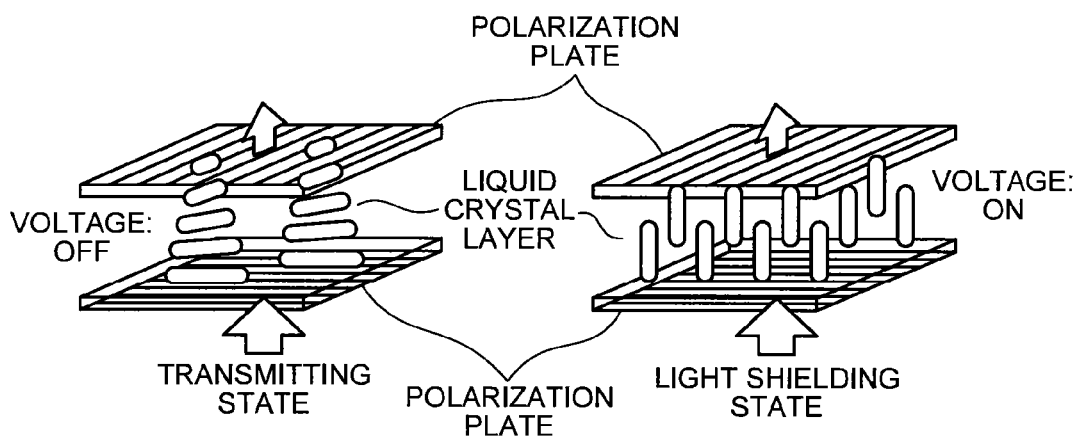

FIGS. 2A and 2B are views for explaining an example of a stereoscopic display monitor on which stereoscopic display is performed with two parallax images. In the example illustrated in FIGS. 2A and 2B, the stereoscopic display monitor performs a stereoscopic display by a shutter method, and shutter glasses are used as stereoscopic glasses worn by an observer who observes the monitor. The stereoscopic display monitor alternately outputs a two-parallax image in the monitor. For example, the monitor illustrated in FIG. 2A alternately outputs a left-eye image and a right-eye image with 120 Hz. As illustrated in FIG. 2A, the monitor includes an infrared-ray output unit, and controls an output of an infrared ray according to a timing at which images are switched.

The infrared ray output from the infrared-ray output unit is received by an infrared-ray receiving unit of the shutter glasses illustrated in FIG. 2A. A shutter is mounted to each of right and left frames of the shutter glasses, and the shutter glasses alternately switch a transmission state and a light shielding state of the right and left shutters according to a timing at which the infrared-ray receiving unit receives the infrared ray. A switching process of a transmission state and a light shielding state of the shutter will be described below.

As illustrated in FIG. 2B, each shutter includes an incident side polarizing plate and an output side polarizing plate, and further includes a liquid crystal layer disposed between the incident side polarizing plate and the output side polarizing plate. The incident side polarizing plate and the output side polarizing plate are orthogonal to each other as illustrated in FIG. 2B. Here, as illustrated in FIG. 2B, in an OFF state in which a voltage is not applied, light has passed through the incident side polarizing plate rotates at 90° due to an operation of the liquid crystal layer, and passes through the output side polarizing plate. In other words, the shutter to which a voltage is not applied becomes a transmission state.

Meanwhile, as illustrated in FIG. 2B, in an ON state in which a voltage is applied, a polarization rotation operation caused by liquid crystal molecules of the liquid crystal layer does not work, and thus light having passed through the incident side polarizing plate is shielded by the output side polarizing plate. In other words, the shutter to which a voltage is applied becomes a light shielding state.

In this regard, for example, the infrared-ray output unit outputs the infrared ray during a time period in which the left-eye image is being displayed on the monitor. Then, during a time period in which the infrared ray is being received, the infrared-ray receiving unit applies a voltage to the right-eye shutter without applying a voltage to the left-eye shutter. Through this operation, as illustrated in FIG. 2A, the right-eye shutter becomes the light shielding state, and the left-eye shutter becomes the transmission state, so that the left-eye image is incident to the left eye of the observer. Meanwhile, during a time period in which the right-eye image is being displayed on the monitor, the infrared-ray output unit stops an output of the infrared ray. Then, during a time period in which the infrared ray is not being received, the infrared-ray receiving unit applies a voltage to the left-eye shutter without applying a voltage to the right-eye shutter. Through this operation, the left-eye shutter becomes the light shielding state, and the right-eye shutter becomes the transmission state, so that the right-eye image is incident to the right eye of the observer. As described above, the stereoscopic display monitor illustrated in FIGS. 2A and 2B causes an image stereoscopically viewable to the observer to be displayed by switching an image to be displayed on the monitor in conjunction with the state of the shutter. A monitor employing a polarizing glasses method other than the shutter method is also known as the stereoscopic display monitor that allows a two-parallax image to be stereoscopically viewed.

Further, a stereoscopic display monitor that allows an observer to stereoscopically view a multi-parallax image with the naked eyes such as a nine-parallax image using a light beam controller such as a lenticular lens has been recently put to practical. This kind of stereoscopic display monitor makes a stereoscopic view possible by binocular parallax, and further makes a stereoscopic view possible by kinematic parallax in which an observed video changes with the movement of a point of view of an observer.

Figure 3:
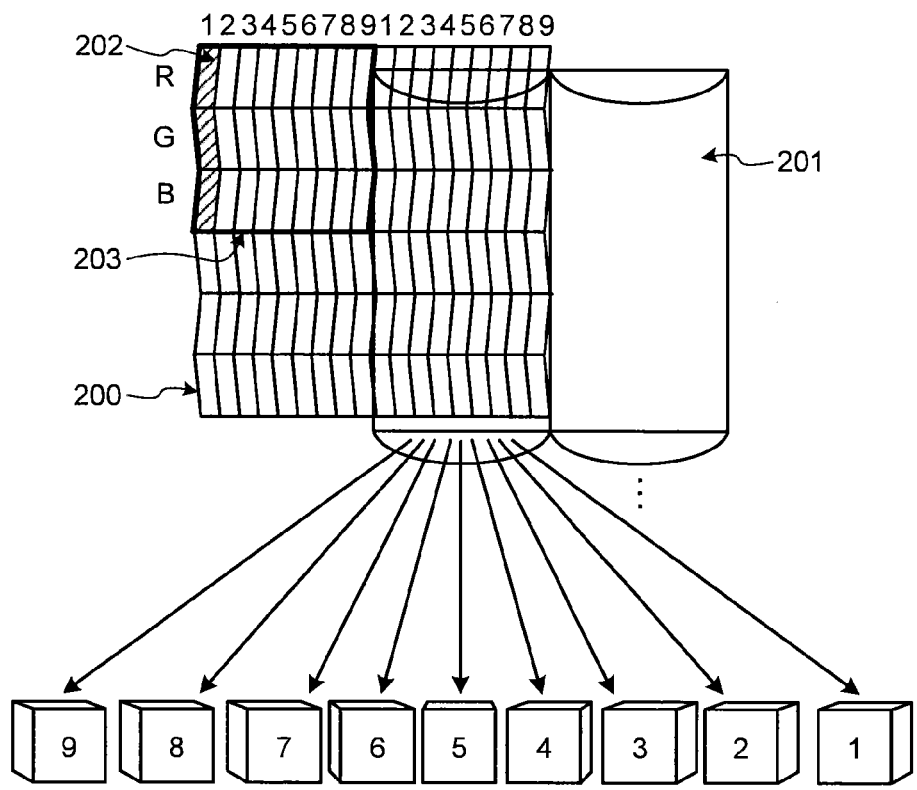
FIG. 3 is a view for explaining an example of a stereoscopic display monitor on which stereoscopic display is performed with nine parallax images.

FIG. 3 is a view for explaining an example of a stereoscopic display monitor on which stereoscopic display is performed with nine parallax images. In the stereoscopic display monitor illustrated in FIG. 3, a light beam controller is arranged in front of a planar display surface 200 such as a liquid crystal panel. For example, in the stereoscopic display monitor illustrated in FIG. 3, a vertical lenticular sheet 201 including an optical opening that extends in a vertical direction is attached to the front surface of the display surface 200 as the light beam controller. In the example illustrated in FIG. 3, the vertical lenticular sheet 201 is attached such that a convex portion thereof serves as the front surface, but the vertical lenticular sheet 201 may be attached such that a convex portion thereof faces the display surface 200.

As illustrated in FIG. 3, in the display surface 200, an aspect ratio is 3:1, and pixels 202 each of which includes three sub-pixels of red (R), green (G), and blue (B) arranged in a longitudinal direction are arranged in the form of a matrix. The stereoscopic display monitor illustrated in FIG. 3 converts a nine-parallax image including nine images into an interim image arranged in a predetermined format (for example, in a lattice form), and outputs the interim image to the display surface 200. In other words, the stereoscopic display monitor illustrated in FIG. 3 allocates nine pixels at the same position in the nine-parallax image to the pixels 202 of nine columns, respectively, and then performs an output. The pixels 202 of nine columns become a unit pixel group 203 to simultaneously display nine images having different point-of-view positions.

The nine-parallax image simultaneously output as the unit pixel group 203 in the display surface 200 is radiated as parallel light through a Light Emitting Diode (LED) backlight, and further radiated in multiple directions through the vertical lenticular sheet 201. As light of each pixel of the nine-parallax image is radiated in multiple directions, lights incident to the left eye and the right eye of the observer change in conjunction with the position (the position of the point of view) of the observer. In other words, depending on an angle at which the observer views, a parallax image incident to the right eye differs in a parallactic angle from a parallax image incident to the left eye. Through this operation, the observer can stereoscopically view a shooting target, for example, at each of nine positions illustrated in FIG. 3. For example, the observer can stereoscopically view, in a state in which the observer directly faces a shooting target, at the position of "5" illustrated in FIG. 3, and can stereoscopically view, in a state in which a direction of a shooting target is changed, at the positions other than "5" illustrated in FIG. 3. The stereoscopic display monitor illustrated in FIG. 3 is merely an example. The stereoscopic display monitor that displays the nine-parallax image may include a horizontal stripe liquid crystal of "RRR - - - , GGG - - - , and BBB - - - " as illustrated in FIG. 3 or may include a vertical stripe liquid crystal of "RGBRGB - - - ." Further, the stereoscopic display monitor illustrated in FIG. 3 may be of a vertical lens type in which a lenticular sheet is vertical as illustrated in FIG. 3 or may be of an oblique lens type in which a lenticular sheet is oblique.

The configuration example of the image processing system 1 according to the first embodiment has been briefly described so far. An application of the image processing system 1 described above is not limited to a case in which the PACS is introduced. For example, the image processing system 1 is similarly applied even to a case in which an electronic chart system for managing an electronic chart with a medical image attached thereto is introduced. In this case, the image storage device 120 serves as a database for managing an electronic chart. Further, for example, the image processing system 1 is similarly applied even to a case in which a Hospital Information System (HIS) or Radiology Information System (RIS) is introduced. Further, the image processing system 1 is not limited to the above-described configuration example. A function or an assignment of each device may be appropriately changed according to an operation form.

Figure 4:
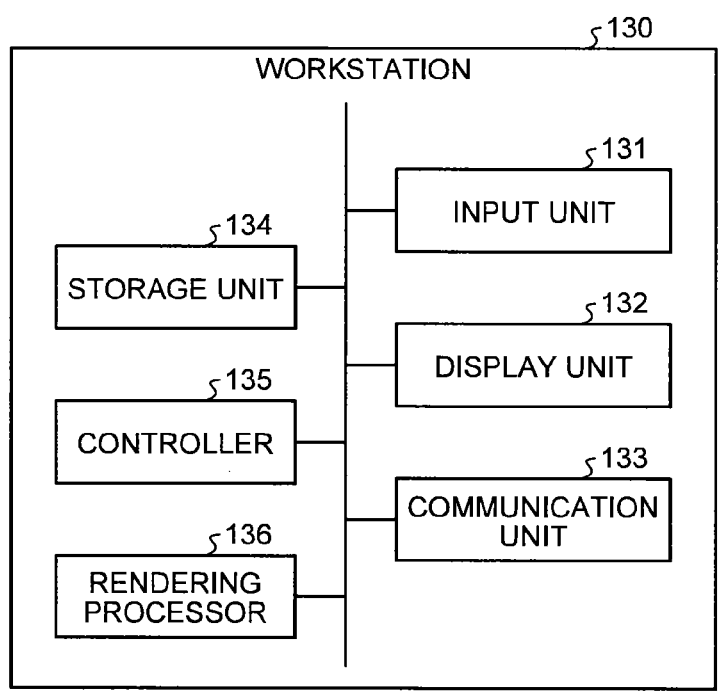
FIG. 4 is a diagram for explaining a configuration example of a workstation in the first embodiment.

Next, a configuration example of a workstation according to the first embodiment will be described with reference to FIG. 4. FIG. 4 is a diagram for explaining a configuration example of a workstation in the first embodiment. In the following, a "parallax image group" refers to an image group for a stereoscopic view generated by performing a volume rendering process on volume data. Further, a "parallax image" refers to each of images that configure the "parallax image group." In other words, the "parallax image group" is configured with a plurality of "parallax images" having different point-of-view positions.

The workstation 130 according to the first embodiment is a high-performance computer appropriate to image processing or the like, and includes an input unit 131, a display unit 132, a communication unit 133, a storage unit 134, a control unit 135, and a rendering processing unit 136 as illustrated in FIG. 4. In the following, a description will be made in connection with an example in which the workstation 130 is a high-performance computer appropriate to image processing or the like. However, the workstation 130 is not limited to this example, and may be an arbitrary information processing device. For example, the workstation 130 may be an arbitrary personal computer.

The input unit 131 includes a mouse, a keyboard, a trackball, or the like, and receives various operations which an operator has input on the workstation 130. Specifically, the input unit 131 according to the first embodiment receives an input of information used to acquire volume data which is a target of the rendering process from the image storage device 120. For example, the input unit 131 receives an input of the patient ID, the inspection ID, the device ID, the series ID, or the like. Further, the input unit 131 according to the first embodiment receives an input of a condition (hereinafter, referred to as a "rendering condition") related to the rendering process.

The display unit 132 includes a liquid crystal panel serving as a stereoscopic display monitor, and displays a variety of information. Specifically, the display unit 132 according to the first embodiment displays a Graphical User Interface (GUI), which is used to receive various operations from the operator, a parallax image group, or the like. The communication unit 133 includes a Network Interface Card (NIC) or the like and performs communication with other devices.

The storage unit 134 includes a hard disk, a semiconductor memory device, or the like, and stores a variety of information. Specifically, the storage unit 134 according to the first embodiment stores the volume data acquired from the image storage device 120 through the communication unit 133. Further, the storage unit 134 according to the first embodiment stores volume data which is under the rendering process, a parallax image group generated by the rendering process, or the like.

The control unit 135 includes an electronic circuit such as a Central Processing Unit (CPU), a Micro Processing Unit (MPU), or a Graphics Processing Unit (GPU) or an integrated circuit such as an Application Specific Integrated Circuit (ASIC) or a Field Programmable Gate Array (FPGA). The control unit 135 controls the workstation 130 in general.

For example, the control unit 135 according to the first embodiment controls a display of the GUI on the display unit 132 or a display of a parallax image group. Further, for example, the control unit 135 controls transmission/reception of the volume data or the parallax image group to/from the image storage device 120, which is performed through the communication unit 133. Further, for example, the control unit 135 controls the rendering process performed by the rendering processing unit 136. Further, for example, the control unit 135 controls an operation of reading volume data from the storage unit 134 or an operation of storing a parallax image group in the storage unit 134.

The rendering processing unit 136 performs various rendering processes on volume data acquired from the image storage device 120 under control of the control unit 135, and thus generates a parallax image group. Specifically, the rendering processing unit 136 according to the first embodiment reads volume data from the storage unit 134, and first performs pre-processing on the volume data. Next, the rendering processing unit 136 performs a volume rendering process on the pre-processed volume data, and generates a parallax image group. Subsequently, the rendering processing unit 136 generates a 2D image in which a variety of information (a scale, a patient name, an inspection item, and the like) is represented, and generates a 2D output image by superimposing the 2D image on each parallax image group. Then, the rendering processing unit 136 stores the generated parallax image group or the 2D output image in the storage unit 134. Further, in the first embodiment, the rendering process refers to the entire image processing performed on the volume data, and the volume rendering process a process of generating a 2D image in which 3D information is reflected during the rendering process. For example, the medical image generated by the rendering process corresponds to a parallax image.

Figure 5:
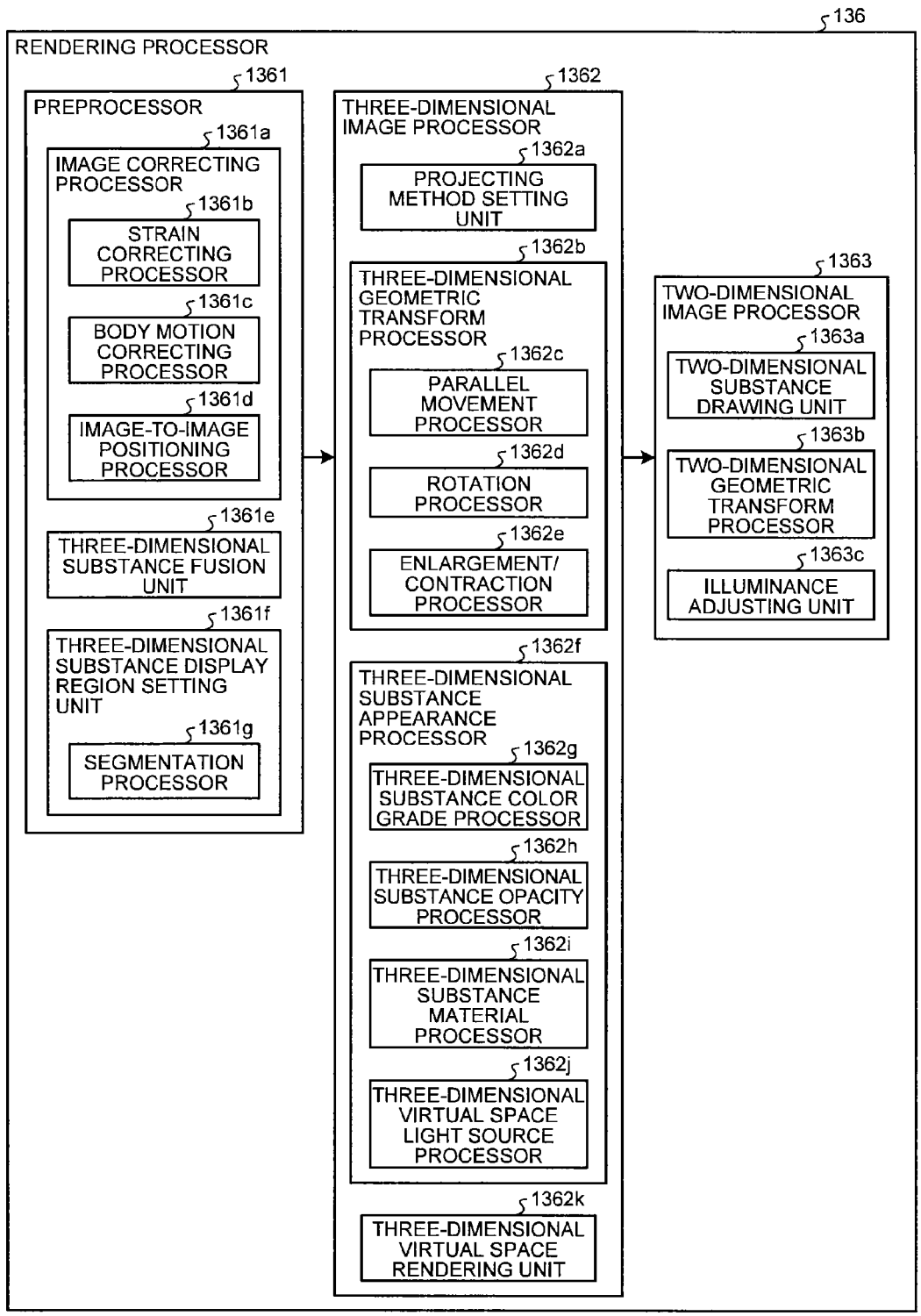
FIG. 5 is a diagram for explaining a configuration example of a rendering processor as illustrated in FIG. 4.

FIG. 5 is a diagram for explaining a configuration example of a rendering processor as illustrated in FIG. 4. As illustrated in FIG. 5, the rendering processing unit 136 includes a pre-processing unit 1361, a 3D image processing unit 1362, and a 2D image processing unit 1363. The pre-processing unit 1361 performs pre-processing on volume data. The 3D image processing unit 1362 generates a parallax image group from pre-processed volume data. The 2D image processing unit 1363 generates a 2D output image in which a variety of information is superimposed on a parallax image group. The respective units will be described below in order.

The pre-processing unit 1361 is a processing unit that performs a variety of pre-processing when performing the rendering process on volume data, and includes an image correction processing unit 1361a, a 3D object fusion unit 1361e, and a 3D object display area setting unit 1361f.

The image correction processing unit 1361a is a processing unit that performs an image correction process when processing two types of volume data as one volume data, and includes a distortion correction processing unit 1361b, a body motion correction processing unit 1361c, and an inter-image positioning processing unit 1361d as illustrated in FIG. 5. For example, the image correction processing unit 1361a performs an image correction process when processing volume data of a PET image generated by a PET-CT device and volume data of an X-ray CT image as one volume data. Alternatively, the image correction processing unit 1361a performs an image correction process when processing volume data of a T1-weighted image and volume data of a T2-weighted image which are generated by an MRI device as one volume data.

Further, the distortion correction processing unit 1361b corrects distortion of individual volume data caused by a collection condition at the time of data collection by the medical image diagnostic device 110. Further, the body motion correction processing unit 1361c corrects movement caused by body motion of a subject during a data collection time period used to generate individual volume data. Further, the inter-image positioning processing unit 1361d performs positioning (registration), for example, using a cross correlation method between two pieces of volume data which have been subjected to the correction processes by the distortion correction processing unit 1361b and the body motion correction processing unit 1361c.

The 3D object fusion unit 1361e performs the fusion of a plurality of volume data which have been subjected to the positioning by the inter-image positioning processing unit 1361d. Further, the processes performed by the image correction processing unit 1361a and the 3D object fusion unit 1361e may not be performed when the rendering process is performed on single volume data.

The 3D object display area setting unit 1361f is a processing unit that sets a display area corresponding to a display target organ designated by an operator, and includes a segmentation processing unit 1361g. The segmentation processing unit 1361g is a processing unit that extracts an organ, such as a heart, a lung, or a blood vessel, which is designated by the operator, for example, by an area extension technique based on a pixel value (voxel value) of volume data.

Further, the segmentation processing unit 1361g does not perform the segmentation process when a display target organ has not been designated by the operator. Further, the segmentation processing unit 1361g extracts a plurality of corresponding organs when a plurality of display target organs are designated by the operator. Further, the process performed by the segmentation processing unit 1361g may be re-executed at a fine adjustment request of the operator who has referred to a rendering image.

The 3D image processing unit 1362 performs the volume rendering process on the pre-processed volume data which has been subjected to the process performed by the pre-processing unit 1361. As processing units for performing the volume rendering process, the 3D image processing unit 1362 includes a projection method setting unit 1362a, a 3D geometric transform processing unit 1362b, a 3D object appearance processing unit 1362f, and a 3D virtual space rendering unit 1362k.

The projection method setting unit 1362a determines a projection method for generating a parallax image group. For example, the projection method setting unit 1362a determines whether the volume rendering process is to be executed using a parallel projection method or a perspective projection method.

The 3D geometric transform processing unit 1362b is a processing unit that determines information necessary to perform 3D geometric transform on volume data which is to be subjected to the volume rendering process, and includes a parallel shift processing unit 1362c, a rotation processing unit 1362d, and a scaling processing unit 1362e. The parallel shift processing unit 1362c is a processing unit that determines a shift amount to shift volume data in parallel when a point-of-view position is shifted in parallel at the time of the volume rendering process. The rotation processing unit 1362d is a processing unit that determines a movement amount for rotationally moving volume data when a point-of-view position is rotationally moved at the time of the volume rendering process. Further, the scaling processing unit 1362e is a processing unit that determines an enlargement ratio or a reduction ratio of volume data when it is requested to enlarge or reduce a parallax image group.

The 3D object appearance processing unit 1362f includes a 3D object color processing unit 1362g, a 3D object opacity processing unit 1362h, a 3D object quality-of-material processing unit 1362i, and a 3D virtual space light source processing unit 1362j. The 3D object appearance processing unit 1362f performs a process of determining a display form of a parallax image group to be displayed through the above processing units, for example, according to the operator's request.

The 3D object color processing unit 1362g is a processing unit that determines a color colored to each area segmented from volume data. The 3D object opacity processing unit 1362h is a processing unit that determines opacity of each voxel configuring each area segmented from volume data. In volume data, an area behind an area having opacity of "100%" is not represented in a parallax image group. Further, in volume data, an area having opacity of "0%" is not represented in a parallax image group.

The 3D object quality-of-material processing unit 1362i is a processing unit that determines the quality of a material of each area segmented from volume data and adjusts the texture when the area is represented. The 3D virtual space light source processing unit 1362j is a processing unit that determines the position or the type of a virtual light source installed in a 3D virtual space when the volume rendering process is performed on volume data. Examples of the type of a virtual light source include a light source that emits a parallel beam from infinity and a light source that emits a radial beam from a point of view.

The 3D virtual space rendering unit 1362k performs the volume rendering process on volume data, and generates a parallax image group. Further, the 3D virtual space rendering unit 1362k uses a variety of information, which is determined by the projection method setting unit 1362a, the 3D geometric transform processing unit 1362b, and the 3D object appearance processing unit 1362f, as necessary when the volume rendering process is performed.

Here, the volume rendering process performed by the 3D virtual space rendering unit 1362k is performed according to the rendering condition. For example, the parallel projection method or the perspective projection method may be used as the rendering condition. Further, for example, a reference point-of-view position, a parallactic angle, and a parallax number may be used as the rendering condition. Further, for example, a parallel shift of a point-of-view position, a rotational movement of a point-of-view position, an enlargement of a parallax image group, and a reduction of a parallax image group may be used as the rendering condition. Further, for example, a color colored, transparency, the texture, the position of a virtual light source, and the type of virtual light source may be used as the rendering condition. The rendering condition may be input by the operator through the input unit 131 or may be initially set. In either case, the 3D virtual space rendering unit 1362k receives the rendering condition from the control unit 135, and performs the volume rendering process on volume data according to the rendering condition. Further, at this time, the projection method setting unit 1362a, the 3D geometric transform processing unit 1362b, and the 3D object appearance processing unit 1362f determine a variety of necessary information according to the rendering condition, and thus the 3D virtual space rendering unit 1362k generates a parallax image group using a variety of information determined.

Figure 6:
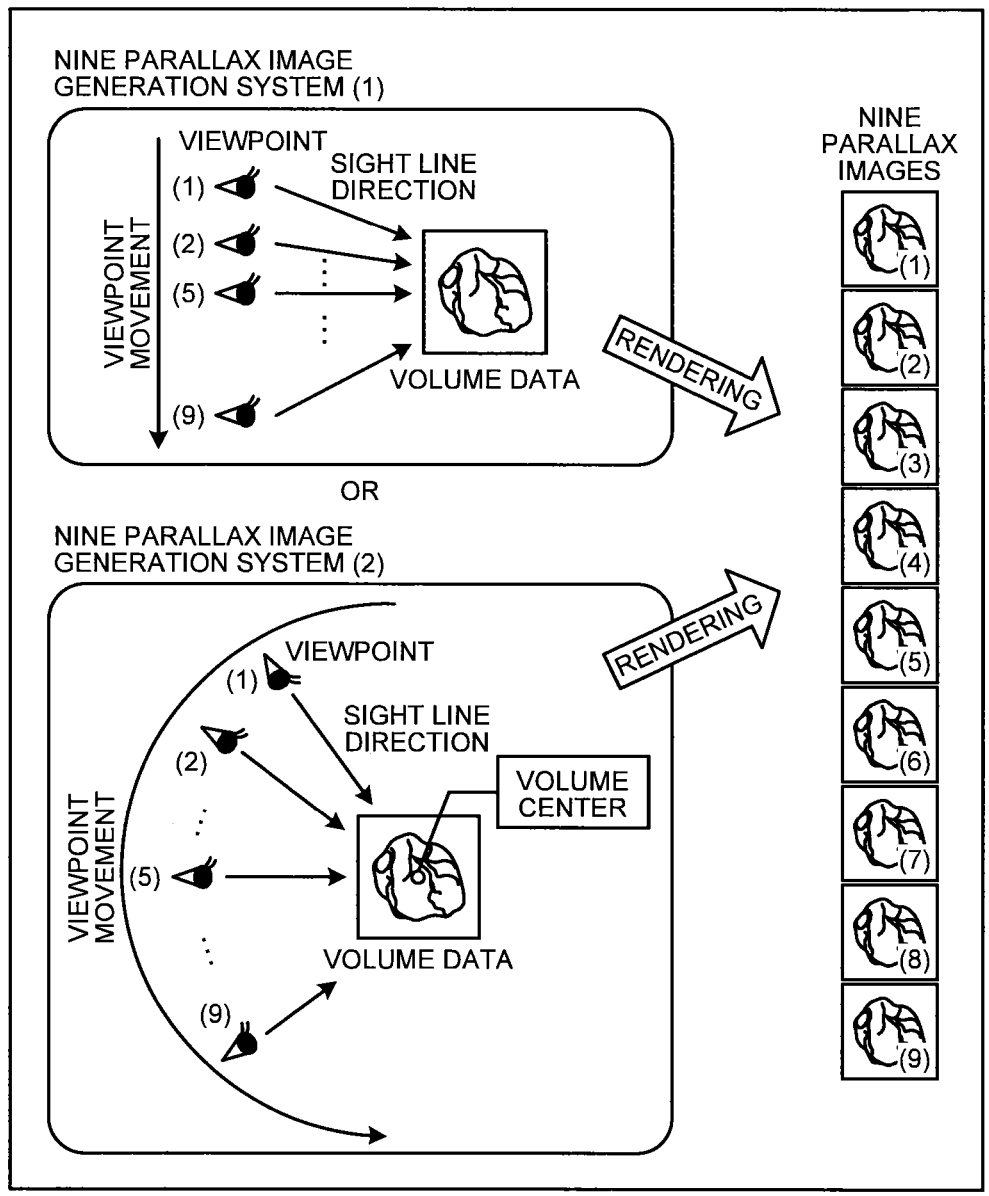
FIG. 6 is a view for explaining an example of volume rendering processing in the first embodiment.

FIG. 6 is a view for explaining an example of volume rendering processing in the first embodiment. For example, let us assume that the 3D virtual space rendering unit 1362k receives the parallel projection method as the rendering condition, and further receives a reference point-of-view position (5) and a parallactic angle "1°" as illustrated in a "nine-parallax image generating method (1)" of FIG. 6. In this case, the 3D virtual space rendering unit 1362k shifts the position of a point of view to (1) to (9) in parallel so that the parallactic angle can be changed by "1°", and generates nine parallax images between which the parallactic angle (an angle in a line-of-sight direction) differs from each other by 1° by the parallel projection method. Further, when the parallel projection method is performed, the 3D virtual space rendering unit 1362k sets a light source that emits a parallel beam in a line-of-sight direction from infinity.

Alternatively, the 3D virtual space rendering unit 1362k receives the perspective projection method as the rendering condition, and further receives a reference point-of-view position (5) and a parallactic angle "1°" as illustrated in a "nine-parallax image generating method (2)" of FIG. 6. In this case, the 3D virtual space rendering unit 1362k rotationally moves the position of a point of view to (1) to (9) so that the parallactic angle can be changed by "1°" centering on the center (gravity center) of volume data, and generates nine parallax images between which the parallactic angle differs from each other by 1° by the perspective projection method. Further, when the perspective projection method is performed, the 3D virtual space rendering unit 1362k sets a point light source or a surface light source, which three-dimensionally emits light in a radial manner centering on a line-of-sight direction, at each point of view. Further, when the perspective projection method is performed, the points of view (1) to (9) may be parallel-shifted according to the rendering condition.

Further, the 3D virtual space rendering unit 1362k may perform the volume rendering process using the parallel projection method and the perspective projection method together by setting a light source that two-dimensionally emits light in a radial manner centering on the line-of-sight direction on a longitudinal direction of a volume rendering image to display, and emits a parallel beam in the line-of-sight direction from infinity on a transverse direction of a volume rendering image to display.

The nine parallax images generated in the above-described way configure a parallax image group. In the first embodiment, for example, the nine parallax images are converted into interim images arranged in a predetermined format (for example, a lattice form) by the control unit 135, and then output to the display unit 132 serving as the stereoscopic display monitor. At this time, the operator of the workstation 130 can perform an operation of generating a parallax image group while checking a stereoscopically viewable medical image displayed on the stereoscopic display monitor.

The example of FIG. 6 has been described in connection with the case in which the projection method, the reference point-of-view position, and the parallactic angle are received as the rendering condition. However, similarly even when any other condition is received as the rendering condition, the 3D virtual space rendering unit 1362k generates the parallax image group while reflecting each rendering condition.

Further, the 3D virtual space rendering unit 1362k further has a function of performing a Multi Planer Reconstruction (MPR) technique as well as the volume rendering and reconstructing an MPR image from volume data. The 3D virtual space rendering unit 1362k further has a function of performing a "curved MPR" and a function of performing "intensity projection."

Subsequently, the parallax image group which the 3D image processing unit 1362 has generated based on the volume data is regarded as an underlay. Then, an overlay in which a variety of information (a scale, a patient name, an inspection item, and the like) is represented is superimposed on the underlay, so that a 2D output image is generated. The 2D image processing unit 1363 is a processing unit that performs image processing on the overlay and the underlay and generates a 2D output image, and includes a 2D object rendering unit 1363a, a 2D geometric transform processing unit 1363b, and a brightness adjusting unit 1363c as illustrated in FIG. 5. For example, in order to reduce a load required in a process of generating a 2D output image, the 2D image processing unit 1363 generates nine 2D output images by superimposing one overlay on each of nine parallax images (underlays). In the following, an underlay on which an overlay is superimposed may be referred to simply as a "parallax image."

The 2D object rendering unit 1363a is a processing unit that renders a variety of information represented on the overlay. The 2D geometric transform processing unit 1363b is a processing unit that parallel-shifts or rotationally moves the position of a variety of information represented on the overlay, or enlarges or reduces a variety of information represented on the overlay.

The brightness adjusting unit 1363c is a processing unit that performs a brightness converting process. For example, the brightness adjusting unit 1363c adjusts brightness of the overlay and the underlay according to an image processing parameter such as gradation of a stereoscopic display monitor of an output destination, a window width (WW), or a window level (WL).

For example, the control unit 135 stores the 2D output image generated as described above in the storage unit 134, and then transmits the 2D output image to the image storage device 120 through the communication unit 133. Then, for example, the terminal device 140 acquires the 2D output image from the image storage device 120, converts the 2D output image into an interim image arranged in a predetermined format (for example, a lattice form), and displays the interim image on the stereoscopic display monitor. Further, for example, the control unit 135 stores the 2D output image in the storage unit 134, then transmits the 2D output image to the image storage device 120 through the communication unit 133, and transmits the 2D output image to the terminal device 140. Then, the terminal device 140 converts the 2D output image transmitted from the workstation 130 into the interim image arranged in a predetermined format (for example, a lattice form), and causes the interim image to be displayed on the stereoscopic display monitor. Through this operation, a doctor or a laboratory technician who uses the terminal device 140 can view a stereoscopically viewable medical image in a state in which a variety of information (a scale, a patient name, an inspection item, and the like) is represented.

Figure 7:
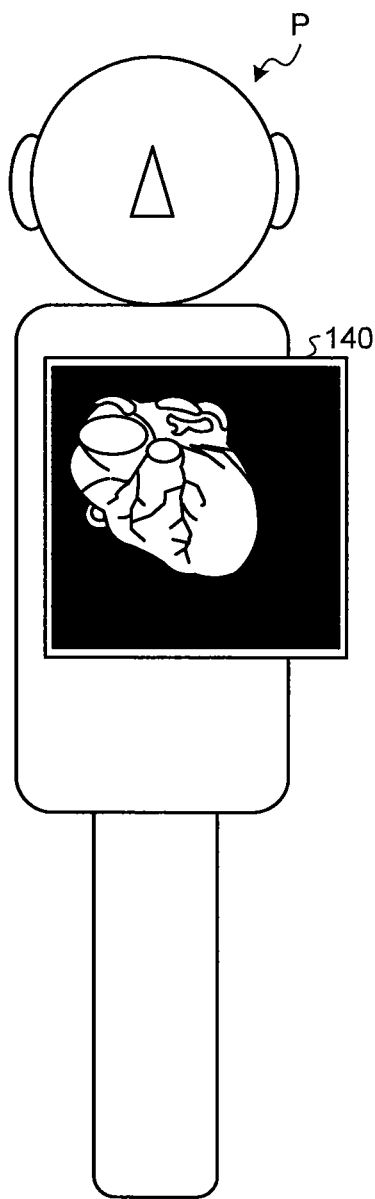
FIG. 7 is a view illustrating an example of a stereoscopic image that is displayed by a terminal device in the first embodiment.

The terminal device 140 in the first embodiment is a portable terminal such as a tablet-type PC, a PDA, or a mobile phone. When the terminal device 140 is held over a subject, the terminal device 140 displays a parallax image group of a site (organ or the like) corresponding to the held position so as to provide a stereoscopic image of the organ or the like to a user. This point is described simply with reference to FIG. 7. FIG. 7 is a view illustrating an example of a stereoscopic image that is displayed by the terminal device 140 in the first embodiment.

FIG. 7 illustrates an example in which a user holds the terminal device 140 over a chest of a subject P. In such a case, the terminal device 140 displays a stereoscopic image of heart as an organ located on the chest of the subject P on a stereoscopic display monitor. With this configuration, the user can observe a stereoscopic image of a site corresponding to a held position only by holding the terminal device 140 over a subject P. Hereinafter, the terminal device 140 in the first embodiment is described in detail.

Figure 8:
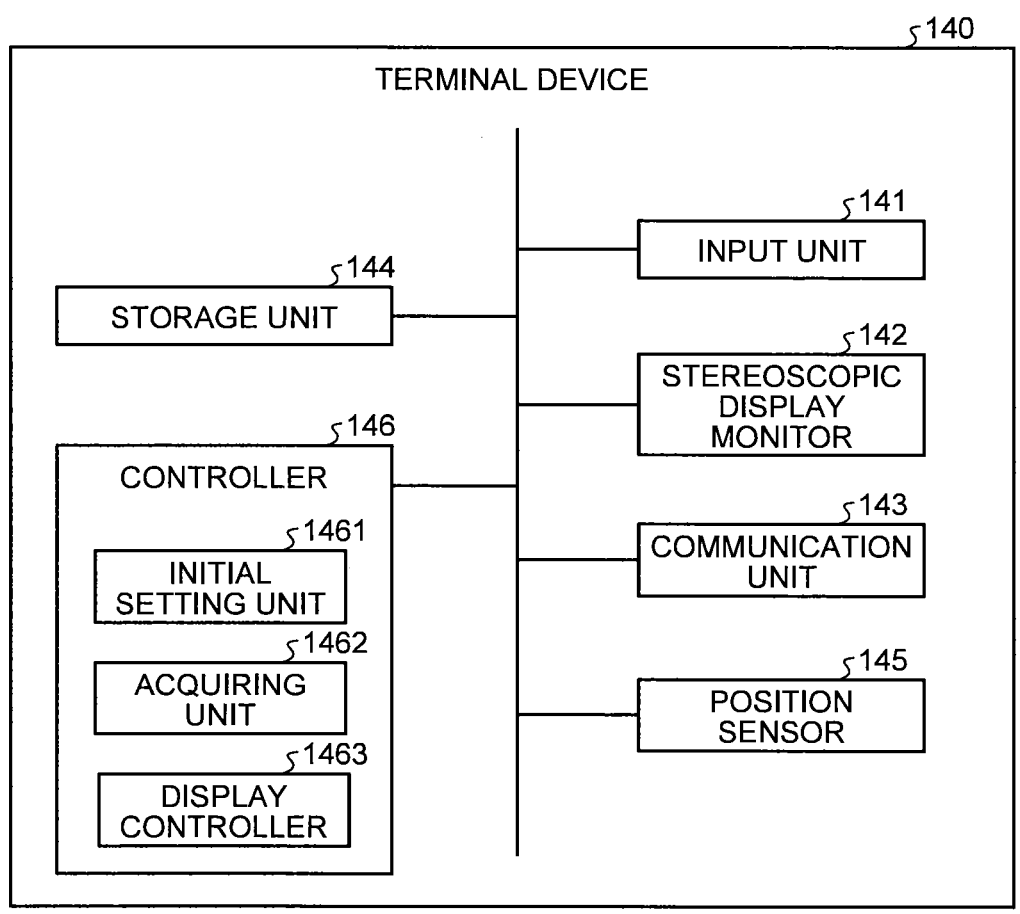
FIG. 8 is a diagram for explaining a configuration example of the terminal device in the first embodiment.

FIG. 8 is a diagram for explaining a configuration example of the terminal device 140 in the first embodiment. The terminal device 140 as illustrated in FIG. 8 is a portable terminal such as a tablet-type PC. When a predetermined operation is operated on the terminal device 140 by a user, the terminal device 140 displays a stereoscopic image in accordance with the operation. As illustrated in FIG. 8, the terminal device 140 in the first embodiment includes an input unit 141, a stereoscopic display monitor 142, a communication unit 143, a storage unit 144, a position sensor 145, and a controller 146.

The input unit 141 is a predetermined key and the like provided on the terminal device 140, and receives input of various operations on the terminal device 140 from an operator. For example, the input unit 141 receives input of a patient ID, a test ID, a device ID, a series ID, and the like for specifying volume data that is desired to be viewed stereoscopically by the operator, as a stereoscopic view request.

The stereoscopic display monitor 142 is a liquid crystal panel or the like as the stereoscopic display monitor, and displays various pieces of information. To be more specific, the stereoscopic display monitor 142 in the first embodiment displays a graphical user interface (GUI) for being received various operations from the operator, a parallax image group, and the like. For example, the stereoscopic display monitor 142 is the stereoscopic display monitor (hereinafter, referred to as two-parallax monitor) as described with reference to FIG. 2A and FIG. 2B, or the stereoscopic display monitor (hereinafter, referred to as nine-parallax monitor) as described with reference to FIG. 6. Hereinafter, a case where the stereoscopic display monitor 142 is the nine-parallax monitor is described.

The terminal device 140 in the first embodiment is a portable terminal such as a tablet-type PC. Therefore, the terminal device 140 may have a touch panel-type display unit in which the input unit 141 and the stereoscopic display monitor 142 are integrated with each other.

The communication unit 143 is a network interface card (NIC) or the like and communicates with another device. To be more specific, the communication unit 143 in the first embodiment transmits a stereoscopic view request received by the input unit 141 to the workstation 130. Furthermore, the communication unit 143 in the first embodiment receives a parallax image group transmitted from the workstation 130 in accordance with the stereoscopic view request.

The storage unit 144 is a hard disk, a semiconductor memory element, or the like, and stores therein various pieces of information. To be more specific, the storage unit 144 stores therein the parallax image group acquired from the workstation 130 through the communication unit 143. Furthermore, the storage unit 144 also stores therein accompanying information (the number of parallaxes, resolution, and the like) of the parallax image group acquired from the workstation 130 through the communication unit 143.

In addition, the storage unit 144 in the first embodiment stores therein an X-ray CT image, a roentgen image, and the like of a subject P that have been shot by the medical image diagnostic device 110. Such an X-ray CT image or a roentgen image is a two-dimensional image generated by shooting a wide range of the subject P and corresponds to an image A10 in FIG. 9, which will be described later, for example. Hereinafter, the X-ray CT image or the roentgen image is expressed as a "scanogram image" in some cases.

The position sensor 145 detects a position of the terminal device 140 relative to the subject P. It is to be noted that in the first embodiment, an outgoing unit of a position sensor is also attached to the subject P, and the position sensor 145 that the terminal device 140 has is a receiving unit of the position sensor. That is to say, the position sensor 145 receives a signal from the position sensor attached to the subject P so as to detect a position of the terminal device 140 relative to the subject P. These position sensors will be described later.

The controller 146 is an electronic circuit such as a CPU, an MPU and a GPU, or an integrated circuit such as an ASIC and an FPGA, and controls the terminal device 140 entirely. For example, the controller 146 controls transmission and reception of a stereoscopic view request and a parallax image group that are performed between the workstation 130 and the terminal device 140 through the communication unit 143. Furthermore, for example, the controller 146 controls storage of the parallax image group in the storage unit 144, and reading of the parallax image group from the storage unit 144.

The controller 146 includes an initial setting unit 1461, an acquiring unit 1462, and a display controller 1463 as illustrated in FIG. 8. When the terminal device 140 is held over the subject P, a parallax image group of a site (organ or the like) corresponding to the held position is displayed on the terminal device 140 with pieces of processing by these processors. This makes it possible to provide a stereoscopic image of the organ or the like to the user.

The initial setting unit 1461 sets a reference position of the terminal device 140 relative to the subject P. The acquiring unit 1462 acquires a position of the terminal device 140 relative to the subject P. The acquiring unit 1462 in the first embodiment acquires positional variation of the terminal device 140 relative to the reference position set by the initial setting unit 1461. To be more specific, the acquiring unit 1462 acquires relative positional variation of the terminal device 140 relative to the subject P based on a position that is detected by the position sensor 145. The display controller 1463 causes the stereoscopic display monitor 142 to display a parallax image group. To be more specific, the display controller 1463 in the first embodiment causes the stereoscopic display monitor 142 to display a predetermined parallax image group with a display method in accordance with the positional variation acquired by the acquiring unit 1462.

Figure 9:
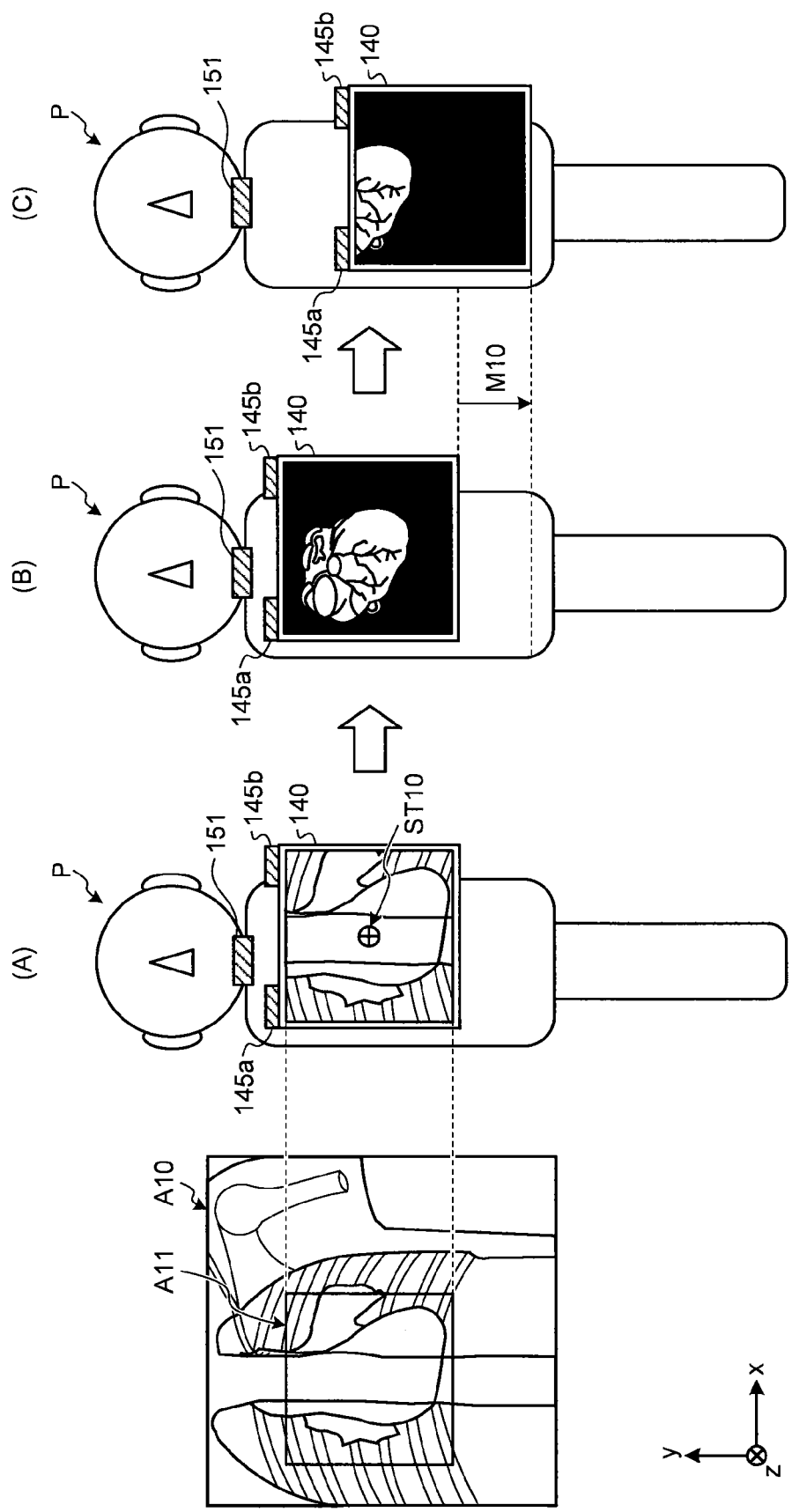
FIG. 9 is a view for explaining an example of processing by the terminal device in the first embodiment.
Figure 10:
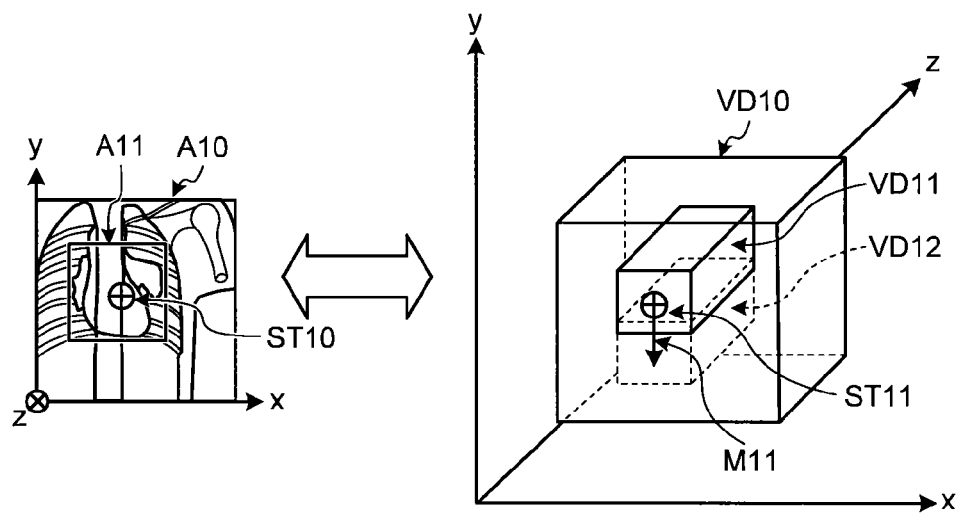
FIG. 10 is a view for explaining an example of processing by the terminal device in the first embodiment.

Then, an example of processing by the initial setting unit 1461, the acquiring unit 1462, and the display controller 1463 in the first embodiment is described with reference to FIG. 9 and FIG. 10. FIG. 9 and FIG. 10 are views for explaining an example of processing by the terminal device 140 in the first embodiment. Hereinafter, a lateral direction (x direction) corresponds to a direction horizontal to a surface of the ground and a lateral direction of the terminal device 140, a longitudinal direction (y direction) corresponds to a direction perpendicular to the surface of the ground and a longitudinal direction of the terminal device 140, and a depth direction (z direction) corresponds to a direction perpendicular to an xy plane and a direction perpendicular to a display surface of the terminal device 140.

As a premise of the example as illustrated in FIG. 9 and FIG. 10, the workstation 130 stores therein volume data VD10 generated when a subject P is shot by the medical image diagnostic device 110. Alternatively, it is assumed that the workstation 130 can acquire the volume data VD10 from the image storage device 120. Furthermore, it is assumed that the scanogram image A10 as illustrated in FIG. 9 is generated when a wide range around the chest of the subject P is shot by the medical image diagnostic device 110. The scanogram image A10 is stored in the storage unit 144 of the terminal device 140 and is also stored in the storage unit 134 of the workstation 130. In addition, the workstation 130 stores therein information relating to a positional relationship between the volume data VD10 and the scanogram image A10. That is to say, the workstation 130 stores therein information indicating a position of the volume data VD10 to which a predetermined position of the scanogram image A10 corresponds.

On the premise as described above, in the example as illustrated in FIG. 9, a position sensor 151 is attached to the vicinity of a neck (cervical region) of the subject P, and position sensors 145a and 145b are provided on an upper side surface of the terminal device 140. It is to be noted that the position sensors 145a and 145b correspond to the position sensor 145 as illustrated in FIG. 8. Hereinafter, when the position sensor 145a and the position sensor 145b need not be distinguished from each other, they are referred to as "position sensor 145" collectively in some cases. The position sensor 145 receives a signal from the position sensor 151 so as to detect a position of the terminal device 140 relative to the subject P.

The initial setting unit 1461 of the terminal device 140 in the first embodiment receives an operation of displaying a part of the scanogram image A10 through the input unit 141 from a user. In the example as illustrated in FIG. 9, the initial setting unit 1461 receives an operation of displaying an image A11 in the vicinity of a heart in the scanogram image A10. In this case, the display controller 1463 displays the image A11 on the stereoscopic display monitor 142, as illustrated in FIG. 9(A). It is to be noted that the image A11 is a two-dimensional image.

Subsequently, the terminal device 140 on which the image A11 is displayed is held over a position of the subject P as indicated by the image A11 by the user, as illustrated in FIG. 9(A). In the example as illustrated in FIG. 9(A), since the image A11 of the vicinity of the heart is displayed on the stereoscopic display monitor 142, the terminal device 140 is held over the vicinity of the chest of the subject P. At this time, the initial setting unit 1461 of the terminal device 140 may display a guiding message directing to hold the terminal device 140 over a position indicated by the image A11 on the stereoscopic display monitor 142.

Then, the initial setting unit 1461 of the terminal device 140 receives an operation of setting a reference position through the input unit 141 from a user in a state of being held over the subject P. In this case, the initial setting unit 1461 determines that the terminal device 140 is opposed to a position corresponding to a site indicated by the image A11. At this time, the initial setting unit 1461 determines that a predetermined position in the image A11 is set to the reference position. In the example as illustrated in FIG. 9(A), the initial setting unit 1461 sets the gravity center of the image A11 to a reference position ST10.

Thereafter, the initial setting unit 1461 transmits the reference position ST10 determined in this manner to the workstation 130. For example, when the scanogram image A10 as a two-dimensional image is expressed with a two-dimensional coordinate system, the initial setting unit 1461 transmits coordinates of the reference position ST10 in the scanogram image A10 to the workstation 130. Note that the two-dimensional coordinate system with which the scanogram image A10 is expressed is shared on the terminal device 140 and the workstation 130.

The workstation 130 that has received the reference position ST10 specifies a position in the volume data VD10 that corresponds to the reference position ST10. This point is described with reference to FIG. 10. The volume data VD10 as illustrated in FIG. 10 has been generated when the subject P has been shot by the medical image diagnostic device 110. The volume data VD10 is in a state of being arranged in a three-dimensional virtual space (hereinafter, referred to as "volume data space" in some cases) expressed with a three-dimensional coordinate system of the lateral direction (x direction), the longitudinal direction (y direction), and the depth direction (z direction). Furthermore, the scanogram image A10 as illustrated in FIG. 10 corresponds to an image when the volume data VD10 is seen from a direction (perpendicular to the xy plane) perpendicular to the lateral direction (x direction) and the longitudinal direction (y direction).

The workstation 130 stores therein information that relates a positional relationship between the scanogram image A10 and the volume data VD10 as described above. For example, the workstation 130 stores therein functions "F1" and "F2" expressed by "x2=F1(x1)" and "y2=F2(x2)" when a two-dimensional coordinate system (xy coordinate system) of the scanogram image A10 is (x1, y1) and a volume data space (xyz coordinate system) is (x2, y2, z2). It is to be noted that the functions "F1" and "F2" are determined by sizes of the scanogram image A10 and the volume data VD10, a shooting direction of the scanogram image A10, and the like. Accordingly, the functions "F1" and "F2" may be set previously by the system or may be calculated by the controller 135 dynamically.

When the controller 135 of the workstation 130 has received the reference position ST10 from the terminal device 140, the controller 135 of the workstation 130 specifies a reference position ST11 of the volume data VD10 that corresponds to the reference position ST10 using the functions "F1" and "F2".

Subsequently, the initial setting unit 1461 of the terminal device 140 acquires a parallax image group corresponding to a site indicated by the image A11 from the workstation 130. To be more specific, the initial setting unit 1461 transmits an acquisition request including positional information of the image A11 in the scanogram image A10 to the workstation 130 so as to acquire a parallax image group corresponding to the image A11 from the workstation 130. For example, the initial setting unit 1461 transmits coordinates of four corners of the image A11 in the scanogram image A10 to the workstation 130 as positional information of the image A11.

The controller 135 of the workstation 130 that has received the acquisition request from the terminal device 140 controls the rendering processor 136 so as to extract volume data corresponding to the positional information of the image A11. Furthermore, the controller 135 controls the rendering processor 136 so as to perform rendering processing on the extracted volume data. With this, the rendering processor 136 extracts volume data to generate a parallax image group from the extracted volume data.

As will be described using the example as illustrated in FIG. 10, the controller 135 controls the rendering processor 136 so as to perform the rendering processing on volume data VD11 in the volume data VD10 that corresponds to the positional information of the image A11. For example, the controller 135 calculates xy coordinates in the volume data space from the xy coordinates of the image A11 in the scanogram image A10 using the above-described functions "F1" and "F2" so as to specify a region (z is arbitrary) in the volume data space including the calculated xy coordinates as a position of the volume data VD11. Then, the controller 135 controls the rendering processor 136 so as to perform the rendering processing on the volume data VD11.

With this, the rendering processor 136 (for example, the segmentation processor 1361g and the three-dimensional geometric transform processor 1362b) in the first embodiment determines a viewpoint position and a sight line direction such that the rendering target is the volume data VD11. Then, the rendering processor 136 performs volume rendering processing on the volume data VD11 so as to generate a parallax image group. The workstation 130 transmits the parallax image group that has been generated by the rendering processor 136 in this manner to the terminal device 140.

The display controller 1463 of the terminal device 140 displays the parallax image group received from the workstation 130 on the stereoscopic display monitor 142 so as to provide a stereoscopic image that corresponds to a site indicated by the image A11 to a user, as illustrated in FIG. 9(B).

Thus, in the first embodiment, when a user performs an operation of setting a reference position after the user holds the terminal device 140 over the subject P in a state where the image A11 is displayed on the terminal device 140, the user can observe an organ or the like of the subject P corresponding to the held position as a stereoscopic image. The above-described processing corresponds to initial set processing by the initial setting unit 1461.

Thereafter, when the terminal device 140 is moved from the state as illustrated in FIG. 9(B) and is held over a different position of the subject P as in the example as illustrated in FIG. 9(C), the terminal device 140 displays a parallax image group of a site (organ or the like) of the subject P that corresponds to the position after being moved.

To be more specific, when the terminal device 140 is moved to the state as illustrated in FIG. 9(C) from the state as illustrated in FIG. 9(B), positional information of the terminal device 140 relative to the subject P that is detected by the position sensor 145 of the terminal device 140 also varies. Then, the acquiring unit 1462 of the terminal device 140 acquires relative positional variation of the terminal device 140 relative to the subject P based on the positional information that is detected by the position sensor 145. To be more specific, the acquiring unit 1462 calculates a difference between a position of the terminal device 140 relative to the subject P at the reference position and a position of the terminal device 140 relative to the subject P after being moved so as to acquire a movement vector of the terminal device 140.

For example, if the operation of setting a reference position is performed as in the example as illustrated in FIG. 9(A), the acquiring unit 1462 stores positional information of the terminal device 140 relative to the subject P at that time in the storage unit 144 and the like. Then, when positional information that is detected by the position sensor 145 varies as in the example as illustrated in FIG. 9(C), the acquiring unit 1462 acquires a movement vector M10 indicating a movement amount and a movement direction of the terminal device 140 as relative positional variation of the terminal device 140 relative to the subject P based on the varied positional information and the positional information stored in the storage unit 144 and the like. Thereafter, the acquiring unit 1462 transmits the movement vector M10 of the terminal device 140 to the workstation 130 so as to acquire a parallax image group corresponding to the position after being moved from the workstation 130. It is to be noted that in the example as illustrated in FIG. 9(C), a direction of the movement vector M10 of the terminal device 140 is assumed to be a direction parallel with the y direction. That is to say, in the example as illustrated in FIG. 9(C), the terminal device 140 is assumed to be moved directly downward by a user.

The controller 135 of the workstation 130 that has received the movement vector M10 of the terminal device 140 converts the movement vector M10 in a real space in which the terminal device 140 is present actually to a movement vector (assumed to be "movement vector M11") in a volume data space. Only scale sizes of the real space and the volume data space are different from each other. Therefore, the controller 135 can convert the movement vector M10 in the real space to the movement vector M11 corresponding to the volume data space by multiplying a size of the movement vector M10 that has been received from the terminal device 140 by a predetermined value.

Then, the controller 135 specifies volume data corresponding to a site of the subject P that is opposed to the terminal device 140 after being moved based on the movement vector M11. To be more specific, the controller 135 specifies a predetermined region in which a position moved from the reference position ST11 specified in the above manner by the movement vector M11 is set to a center as volume data VD12 corresponding to a position of the subject P over which the terminal device 140 after being moved is held, as illustrated in FIG. 10. It is to be noted that sizes of the volume data VD12 in the lateral direction (x direction) and the longitudinal direction (y direction) are determined by sizes of the image A11, and the same as the sizes of the above-described volume data VD11. Then, the controller 135 controls the rendering processor 136 so as to perform the rendering processing on the volume data VD12. The workstation 130 transmits a parallax image group generated by the rendering processor 136 to the terminal device 140.

The display controller 1463 of the terminal device 140 displays the parallax image group received from the workstation 130 on the stereoscopic display monitor 142 so as to provide a stereoscopic image corresponding to a position of the subject P over which the terminal device 140 after being moved is held to a user, as illustrated in FIG. 9(C). In this manner, in the first embodiment, when a user moves a position of the terminal device 140 held over the subject P, the user can observe an organ or the like of the subject P that corresponds to the position of the terminal device 140 after being moved as a stereoscopic image.

In FIGS. 9(B) and 9(C), a case where the terminal device 140 is moved in the vertical direction (y direction) only has been described as an example in order to make description easy. However, even when the terminal device 140 in the first embodiment is moved to a side surface or a rear surface of the subject P, the terminal device 140 can display a stereoscopic image corresponding to the held position.

Figure 11:
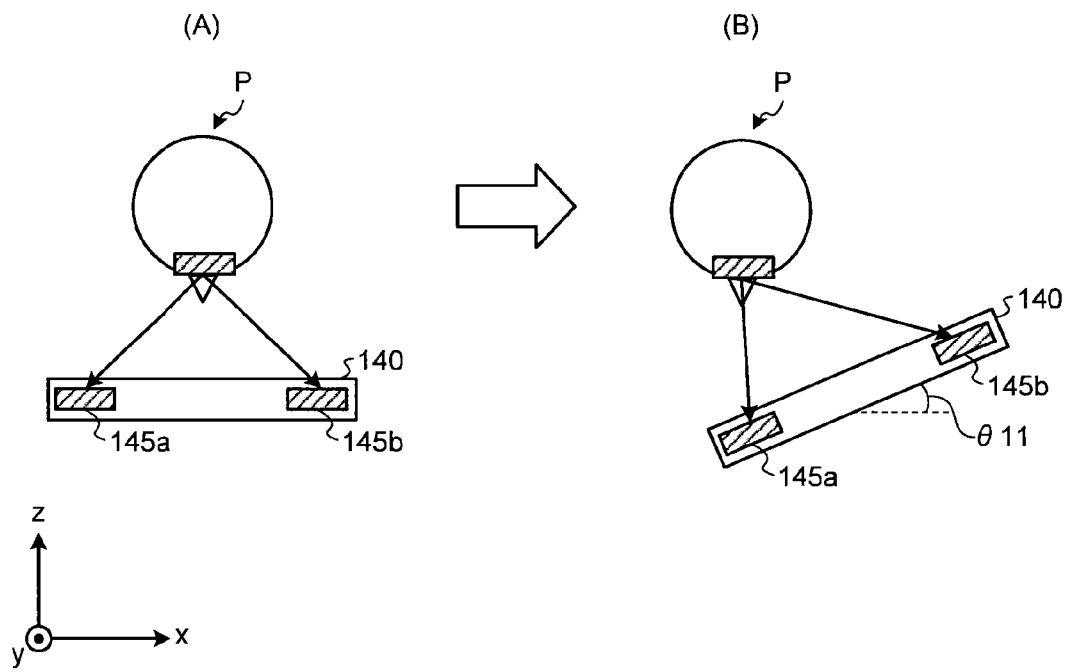
FIG. 11 is a view for explaining an example of processing by the terminal device in the first embodiment.
Figure 12:
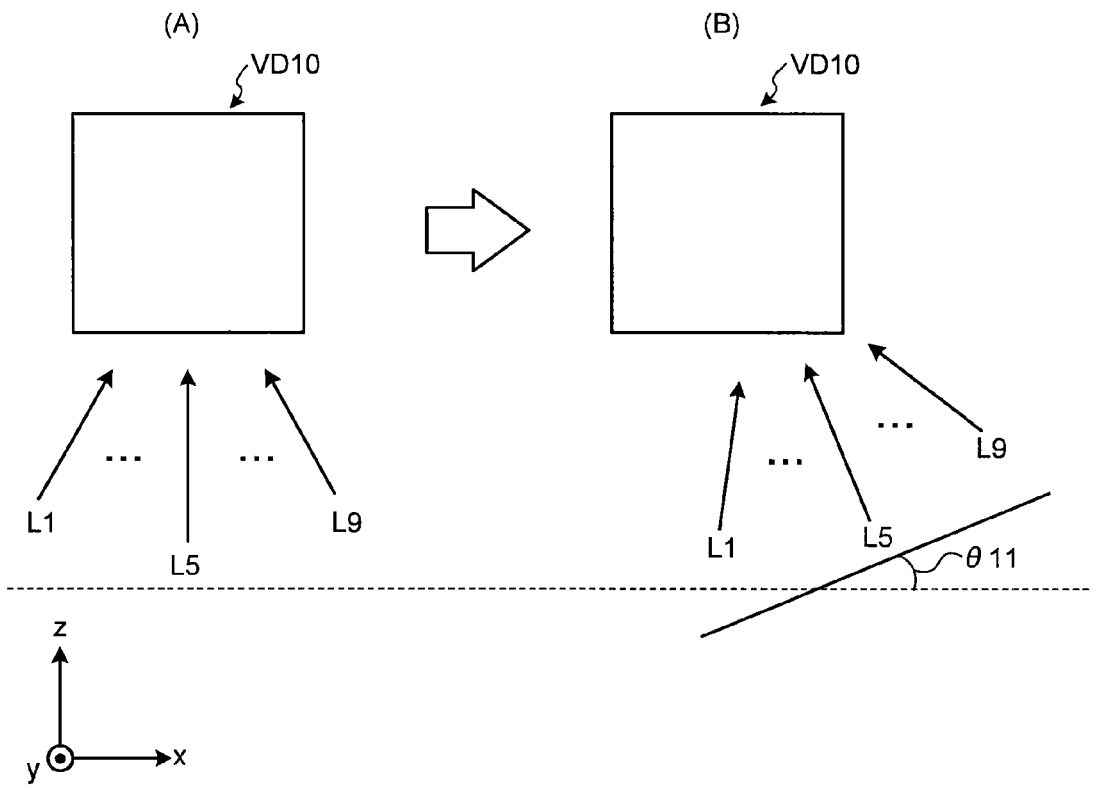
FIG. 12 is a view for explaining an example of processing by the terminal device in the first embodiment.

This point is described in detail with reference to FIG. 11 and FIG. 12. FIG. 11 and FIG. 12 are views for explaining an example of processing by the terminal device 140 in the first embodiment. FIG. 11 is a view when the subject P is seen from the upper side (y direction). FIG. 12 is a view when the volume data VD10 is seen from the upper side (y direction) of the volume data space. Furthermore, FIG. 11(A) illustrates a position of the terminal device 140 when the reference position is set. FIG. 12(A) illustrates a sight line direction L1 and the like at the time of the rendering processing that is performed by the rendering processor 136 when the terminal device 140 is in a state as illustrated in FIG. 11(A). FIG. 12(B) illustrates a sight line direction L1 and the like at the time of the rendering processing that is performed by the rendering processor 136 when the terminal device 140 is in a state as illustrated in FIG. 11(B). It is to be noted that the rendering processing is performed by a perspective projection method.

As illustrated in FIG. 11, the terminal device 140 is assumed to be moved rotationally in a circular-arc form about the subject P as a center. To be more specific, the terminal device 140 is assumed to be moved from the state as illustrated in FIG. 11(A) to the state as illustrated in FIG. 11(B). In this case, the acquiring unit 1462 of the terminal device 140 acquires a movement vector of the terminal device 140 and a slope θ11 of the terminal device 140 after being moved relative to the terminal device 140 at the reference position. The acquiring unit 1462 of the terminal device 140 acquires the movement vector and the slope θ11 based on a movement vector of the position sensor 145a while a position of the position sensor 145a at the reference position is set to a starting point and a movement vector of the position sensor 145b while a position of the position sensor 145b at the reference position is set to a starting point.

To be more specific, the acquiring unit 1462 acquires a movement vector of the terminal device 140 based on arrangement positions of the position sensor 145a and the position sensor 145b. For example, when the position sensor 145a and the position sensor 145b are arranged symmetrically with respect to the gravity center of the terminal device 140 as in the example as illustrated in FIG. 11, the acquiring unit 1462 can acquire a movement vector of the terminal device 140 based on both of the movement vectors thereof. Furthermore, the acquiring unit 1462 calculates an angle formed by a straight line connecting both positions of the position sensor 145a and the position sensor 145b at the reference positions and a straight line connecting both positions of the position sensor 145a and the position sensor 145b after being moved so as to acquire the above-described slope θ11.

The acquiring unit 1462 transmits the movement vector and the slope θ11 of the terminal device 140 that have been acquired in the above manner to the workstation 130. Thus, the terminal device 140 has two position sensors at different positions in the lateral direction so as to acquire the slope θ11 of the terminal device 140 with respect to the lateral direction (x direction).

The controller 135 of the workstation 130 that has received the movement vector and the like of the terminal device 140 specifies volume data corresponding to a position of the subject P over which the terminal device 140 after being moved is held based on the movement vector in the same manner as the example as illustrated in FIG. 10. Furthermore, the controller 135 changes sight line directions to the volume data VD10 at the time of the rendering processing based on the slope θ11 of the terminal device 140, as illustrated in FIG. 12. To be more specific, the controller 135 sets a viewpoint position at the time of the rendering processing to a position of the terminal device 140 after being moved and inclines the sight line direction L1 and the like from the viewpoint position by the slope θ11, as illustrated in FIG. 12. The controller 135 controls the rendering processor 136 so as to perform the rendering processing under these rendering conditions. Then, the workstation 130 transmits a parallax image group generated by the rendering processor 136 to the terminal device 140. With this, the terminal device 140 displays the parallax image group received from the workstation 130 on the stereoscopic display monitor 142. This makes it possible to display a stereoscopic image corresponding to the held position even when the terminal device 140 is moved to a side surface or a rear surface of the subject P.

Figure 13:
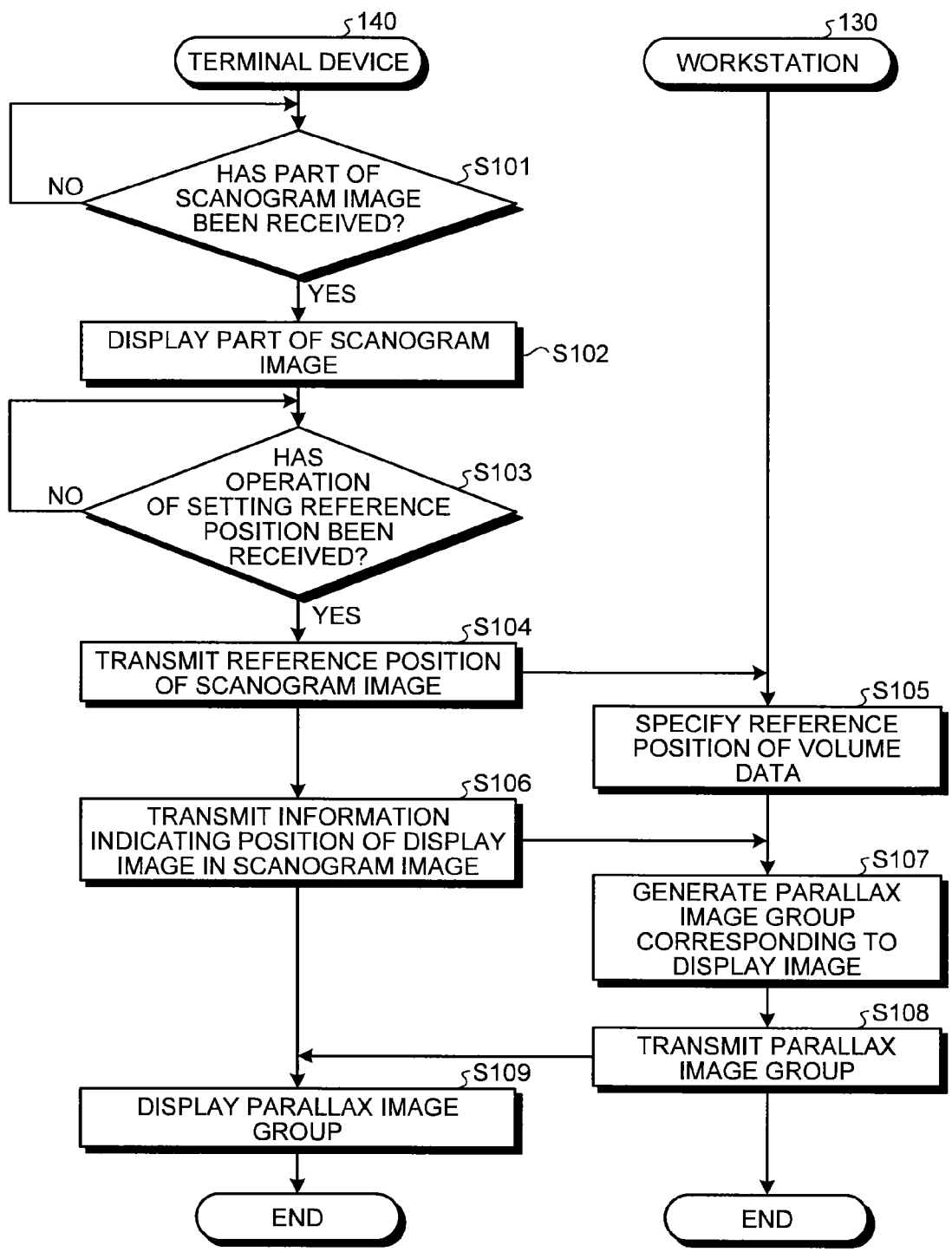
FIG. 13 is a sequence diagram illustrating an example of a processing flow by the image processing system in the first embodiment.
Figure 14:
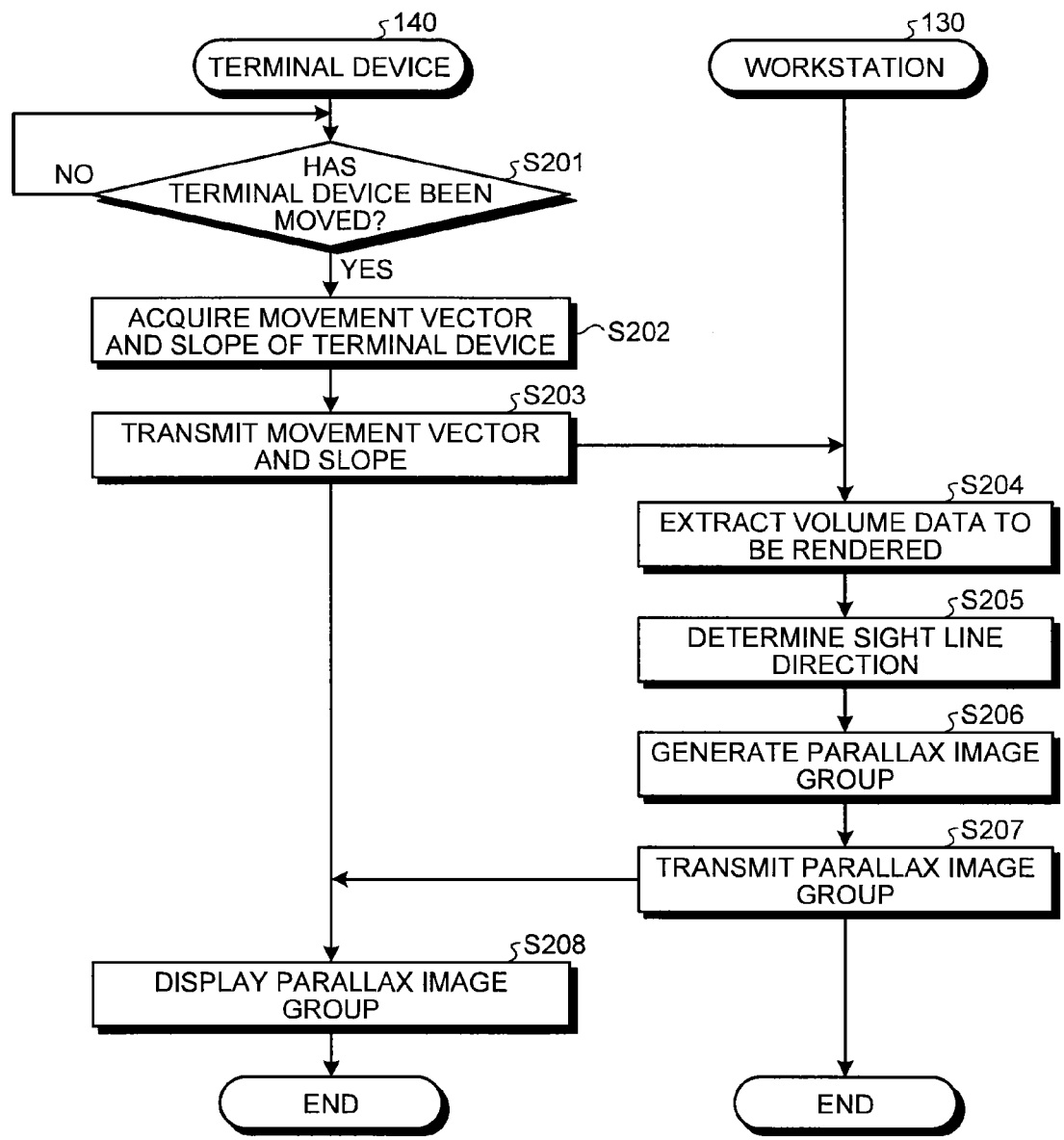
FIG. 14 is a sequence diagram illustrating an example of a processing flow by the image processing system in the first embodiment.

Next, an example of a processing flow by the workstation 130 and the terminal device 140 in the first embodiment is illustrated with reference to FIG. 13 and FIG. 14. FIG. 13 and FIG. 14 are sequence diagrams illustrating an example of a processing flow by the image processing system in the first embodiment. The flow of the initial set processing is described in FIG. 13 and the flow of the display processing when the terminal device 140 is moved is described in FIG. 14.

As illustrated in FIG. 13, the initial setting unit 1461 of the terminal device 140 determines whether an operation of displaying a part of the scanogram image A10 has been received (S101). When the operation has not been received (S101: No), the terminal device 140 is made into a stand-by state. On the other hand, when the operation has been received by the initial setting unit 1461 (S101: Yes), the display controller 1463 displays a part of the scanogram image A10 on the stereoscopic display monitor 142 (S102).

Subsequently, the initial setting unit 1461 determines whether an operation of setting a reference position has been received (S103). When the operation of setting the reference position has not been received (S103: No), the terminal device 140 is made into a stand-by state. On the other hand, when the operation of setting the reference position has been received (S103: Yes), the initial setting unit 1461 determines that a predetermined position in the display image is set to a reference position, and transmits the determined reference position to the workstation 130 (S104). The controller 135 of the workstation 130 specifies a reference position of volume data based on the reference position received from the terminal device 140 (S105).

Thereafter, the initial setting unit 1461 of the terminal device 140 transmits positional information of the display image in the scanogram image A10 to the workstation 130 (S106). The controller 135 of the workstation 130 specifies volume data corresponding to the positional information of the display image and controls the rendering processor 136 so as to perform the rendering processing on the specified volume data. With this, the rendering processor 136 generates a parallax image group from the volume data specified by the controller 135 (S107). The workstation 130 transmits the generated parallax image group to the terminal device 140 (S108).

Then, the display controller 1463 of the terminal device 140 displays the parallax image group received from the workstation 130 on the stereoscopic display monitor 142 (S109). With this, the terminal device 140 can provide a stereoscopic image corresponding to the display image (a part of the scanogram image A10) to a user.

Next, a case where the terminal device 140 is moved is described with reference to FIG. 14. As illustrated in FIG. 14, the acquiring unit 1462 of the terminal device 140 determines whether the terminal device 140 has been moved based on positional information that is detected by the position sensor 145 (S201). When the terminal device 140 has not been moved (S201: No), the terminal device 140 is made into a stand-by state.

On the other hand, when the terminal device 140 has been moved (S201: Yes), the acquiring unit 1462 acquires a movement vector and a slope of the terminal device 140 based on the positional information that is detected by the position sensor 145 (S202). Then, the acquiring unit 1462 transmits the acquired movement vector and the slope to the workstation 130 (S203).

The controller 135 of the workstation 130 converts the movement vector in a real space that has been acquired from the terminal device 140 to a movement vector in a volume data space, and specifies volume data corresponding to a site of a subject P that is opposed to the terminal device 140 after being moved based on the converted movement vector (S204). Furthermore, the controller 135 determines sight line directions at the time of the rendering processing based on the slope of the terminal device 140 (S205).

Then, the controller 135 controls the rendering processor 136 so as to perform the rendering processing on the volume data specified at S204 with the sight line directions determined at S205. With this, the rendering processor 136 generates a parallax image group (S206). The workstation 130 transmits the generated parallax image group to the terminal device 140 (S207).

Then, the display controller 1463 of the terminal device 140 displays the parallax image group received from the workstation 130 on the stereoscopic display monitor 142 (S208). With this, the terminal device 140 can provide a stereoscopic image of a site (organ or the like) corresponding to a position of the subject P to which the terminal device 140 is opposed to a user.

As described above, according to the first embodiment, a stereoscopic image indicating a site of a subject to which the terminal device 140 is opposed can be displayed. Therefore, a user can display a desired stereoscopic image.

It is to be noted that the first embodiment is not limited to the above-described embodiment and may be an embodiment in a mode including some modifications as described below. Hereinafter, modifications of the first embodiment are described with reference to FIG. 15 to FIG. 18.

Detection of Slope of Terminal Device

First, in the above-described first embodiment, the terminal device 140 has two position sensors 145 so as to detect a slop of the terminal device 140. To be more specific, as illustrated in FIG. 11 and FIG. 12, in the above example, a slope of the terminal device 140 with respect to the lateral direction (x direction) is detected. However, the terminal device 140 in the first embodiment is not always held over the subject P while being kept in a horizontal state with respect to the longitudinal direction (y direction). That is to say, the terminal device 140 is held over the subject P in a state of being inclined with respect to the longitudinal direction (y direction) in some cases. Even when the terminal device 140 in the first embodiment is held over the subject P in the state of being inclined with respect to the longitudinal direction (y direction), the terminal device 140 can display a stereoscopic image of the subject P corresponding to the held position.

Figure 15:
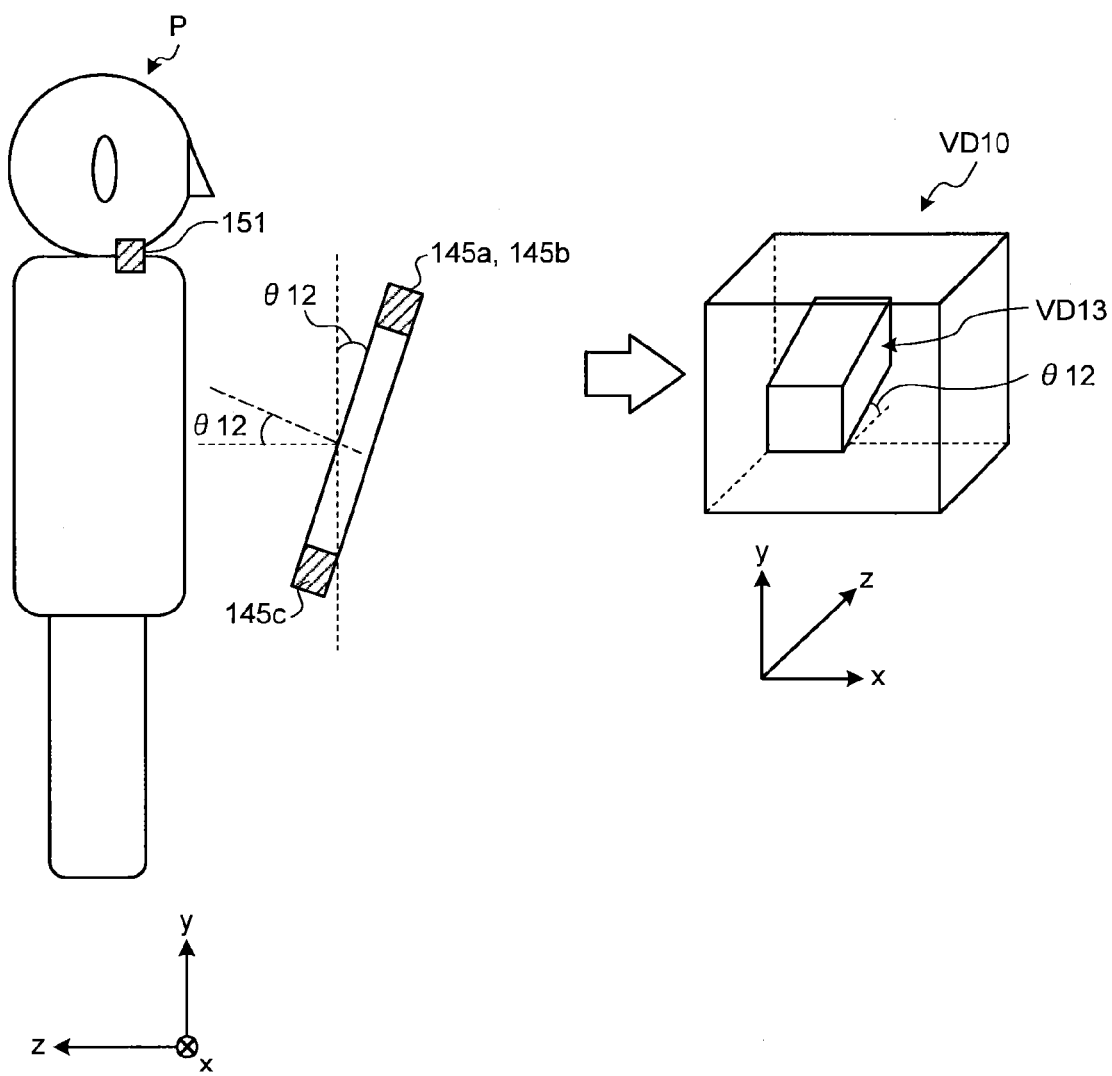
FIG. 15 is a view for explaining a modification of the first embodiment.

This point is described in detail with reference to FIG. 15. In an example as illustrated in FIG. 15, the terminal device 140 has position sensors 145*a* and 145*b* on an upper side surface in the same manner as the example as illustrated in FIG. 9, for example. Furthermore, the terminal device 140 according to the modification has a position sensor 145*c* on a lower side surface. In the example as illustrated in FIG. 15, the acquiring unit 1462 of the terminal device 140 acquires relative positional variation of the terminal device 140 relative to the subject P based on positional information that is detected by the position sensors 145*a*, 145*b*, and 145*c*. In addition, the acquiring unit 1462 of the terminal device 140 acquires a slope θ11 (see, FIG. 11 and FIG. 12) of the terminal device 140 with respect to the lateral direction (x direction), and a slope θ12 (see, FIG. 15) of the terminal device 140 with respect to the longitudinal direction (y direction). Then, the acquiring unit 1462 transmits the movement vector and the slopes θ11 and θ12 of the terminal device 140 that have been acquired to the workstation 130. It is to be noted that in the example as illustrated in FIG. 15, the slope θ11 is assumed to be "0".

The controller 135 of the workstation 130 that has received these various pieces of information specifies volume data VD13 as a rendering target from the volume data VD10 as illustrated in FIG. 15. To be more specific, the controller 135 specifies the volume data VD13 that is inclined with respect to the xz plane in the volume data space by the angle θ12. Then, the controller 135 controls the rendering processor 136 so as to perform the rendering processing on the specified volume data VD13. With this, the rendering processor 136 (for example, the segmentation processor 1361*g* and the three-dimensional geometric transform processor 1362*b*) determines a viewpoint position and a sight line direction such that the rendering target is the volume data VD13. Then, the rendering processor 136 performs the volume rendering processing on the volume data VD13 so as to generate a parallax image group. Therefore, even when the terminal device 140 is inclined with respect to the longitudinal direction (y direction), the terminal device 140 can display a stereoscopic image of the subject P corresponding to a held position by displaying the parallax image group generated by the rendering processor 136 on the stereoscopic display monitor 142.

It is to be noted that the number of position sensors 145 that are provided on the terminal device 140 may be arbitrary. For example, when it has been determined previously that the terminal device 140 is moved horizontally with respect to the longitudinal direction (y direction) in a circular-arc form about the subject P only, it is sufficient that the terminal device 140 has only one position sensor 145. This is because when a movement mode of the terminal device 140 has been determined previously, the workstation 130 can acquire a direction of the terminal device 140 based on the movement mode, and a position of the terminal device 140 that is detected by one position sensor 145.

Alternatively, for example, the terminal device 140 may have equal to or more than four position sensors 145. As the number of position sensors 145 to be provided on the terminal device 140 is larger, the workstation 130 can acquire a position and a direction of the terminal device 140 in detail based on positional information that is detected by the plurality of position sensors 145.

Contraction/Enlargement of Stereoscopic Image

Furthermore, the terminal device 140 in the above-described first embodiment may change a display format of a stereoscopic image to be displayed on the stereoscopic display monitor 142 in accordance with a distance between the terminal device 140 and the subject P. For example, the terminal device 140 may change a scale of the stereoscopic image in accordance with the distance between the terminal device 140 and the subject P.

Figure 16:
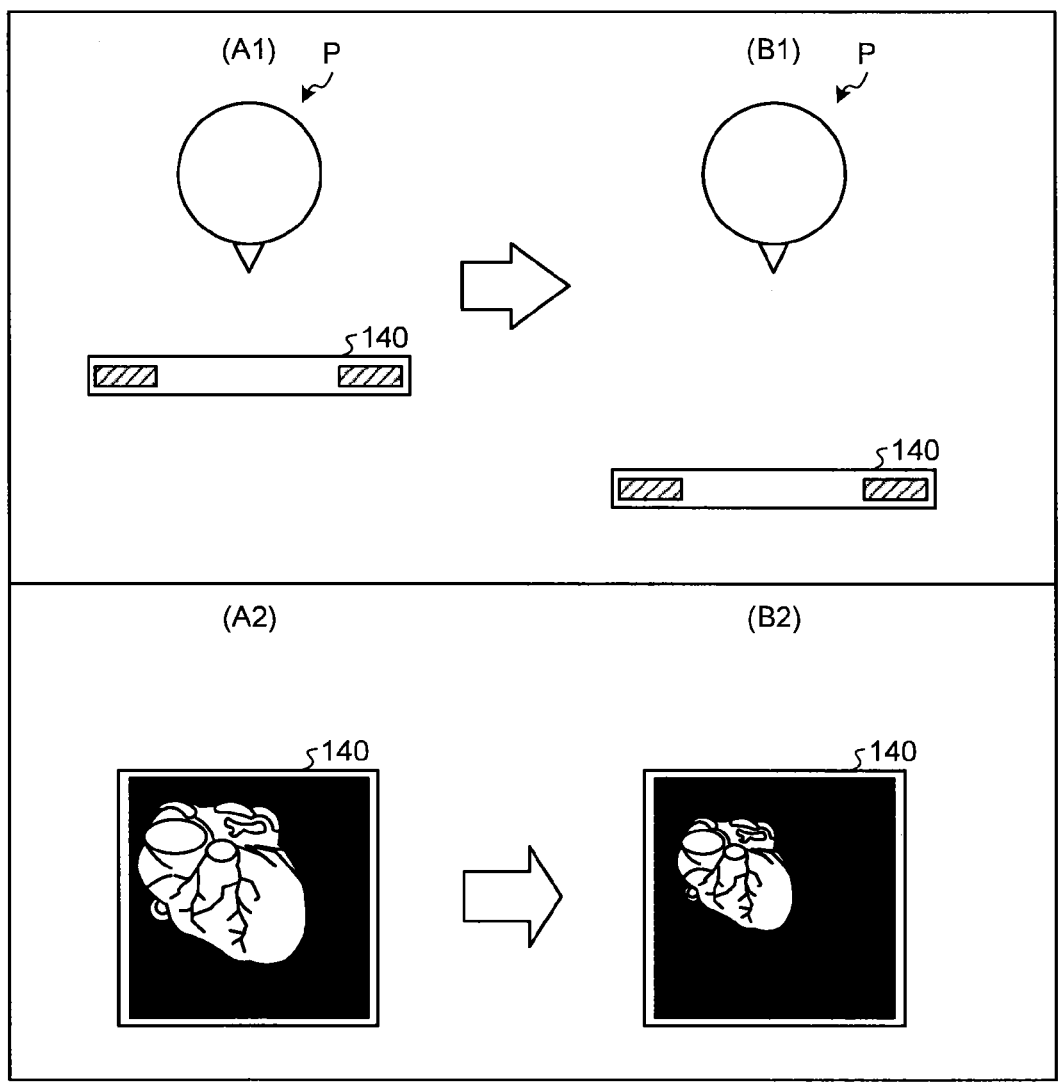
FIG. 16 is a view for explaining another modification of the first embodiment.
Figure 17:
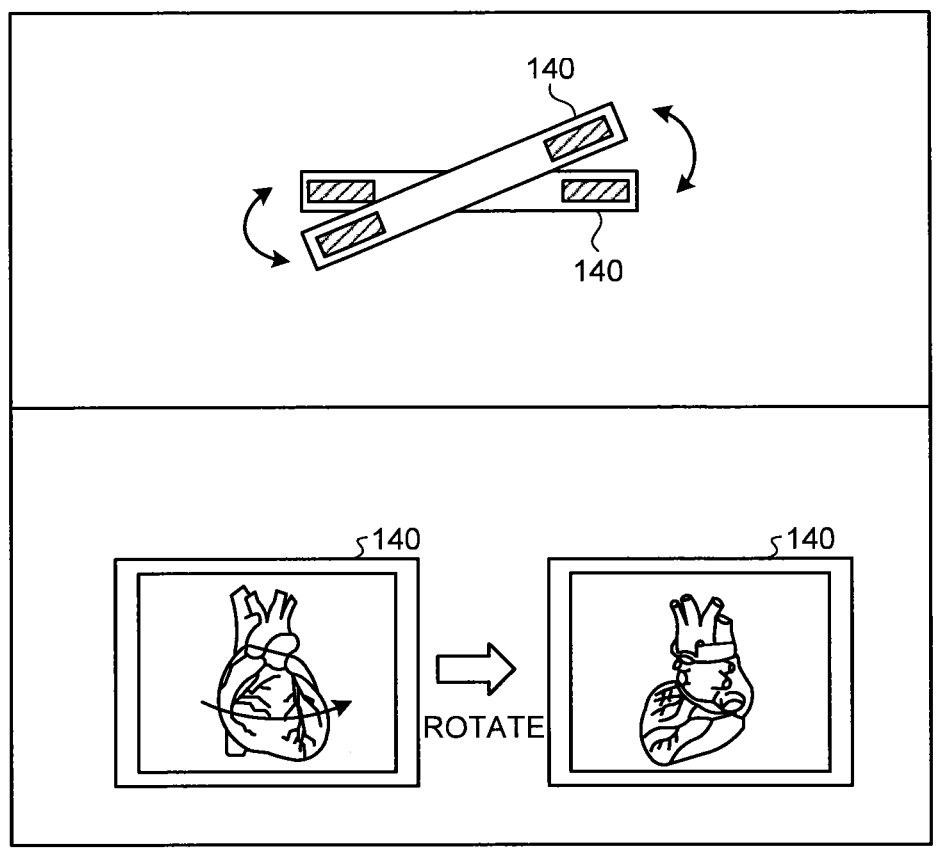
FIG. 17 is a view for explaining still another modification of the first embodiment.

This point is described in detail with reference to FIG. 16. FIG. 16(A1) illustrates a state where a reference position of the terminal device 140 is set. FIG. 16(A2) illustrates a stereoscopic image that is displayed on the stereoscopic display monitor 142 of the terminal device 140 located at the reference position. In this case, as illustrated in FIG. 16(B1), the terminal device 140 is assumed to be moved in a direction of being farther from a subject P. In such a case, the terminal device 140 displays a stereoscopic image that is contracted in comparison with the stereoscopic image (see, FIG. 16(A2)) that is displayed at the reference position, as illustrated in FIG. 16(B2). Furthermore, although not illustrated in the drawings, when the terminal device 140 is moved in a direction of being closer to the subject P, the terminal device 140 displays a stereoscopic image that is enlarged in comparison with the stereoscopic image (see, FIG. 16(A2)) that is displayed at the reference position.

In order to realize display in a contracted/enlarged manner, the controller 135 of the workstation 130 generates a parallax image group that is contracted or enlarged in accordance with a distance between the terminal device 140 and the subject P. For example, as the distance between the terminal device 140 and the subject P is longer, the controller 135 contracts volume data as a rendering target, and controls the rendering processor 136 so as to perform the rendering processing on the volume data after the contraction. On the other hand, for example, as the distance between the terminal device 140 and the subject P is shorter, the controller 135 enlarges volume data as a rendering target, and controls the rendering processor 136 so as to perform the rendering processing on the volume data after the enlargement.

Furthermore, the terminal device 140 in the above-described first embodiment may change a stereoscopic effect of a stereoscopic image by changing a parallax angle of a parallax image group in accordance with the distance between the terminal device 140 and the subject. To be more specific, as a parallax angle between parallax images constituting a parallax image group is larger, a component of a stereoscopic image that is displayed on the stereoscopic display monitor 142 in the depth direction (z direction) is increased so as to increase the stereoscopic effect. On the other hand, as a parallax angle between parallax images is smaller, a component of the stereoscopic image in the depth direction (z direction) is decreased so as to decrease the stereoscopic effect.

Then, the controller 135 of the workstation 130 changes a parallax angle of a parallax image group in accordance with the distance between the terminal device 140 and the subject P. For example, as the distance between the terminal device 140 and the subject P is longer, the controller 135 controls the rendering processor 136 so as to perform the rendering processing with a smaller parallax angle. On the other hand, as the distance between the terminal device 140 and the subject P is shorter, the controller 135 controls the rendering processor 136 so as to perform the rendering processing with a larger parallax angle. In this example, as the terminal device 140 is moved in a direction of being farther from the subject P, the terminal device 140 displays a stereoscopic image having a small stereoscopic effect. On the other hand, as the terminal device 140 is moved in a direction of being closer to the subject P, the terminal device 140 can display a stereoscopic image having a large stereoscopic effect.

In addition, the terminal device 140 in the above-described first embodiment may change a focus position of a stereoscopic image in accordance with the distance between the terminal device 140 and the subject P. To be more specific, the rendering processor 136 of the workstation 130 performs the rendering processing from a plurality of viewpoint positions as described with reference to FIG. 6. Sight line directions from the plurality of viewpoint positions intersect with one another at a predetermined position of volume data. The intersection of the sight line directions serves as a focus of a parallax image group generated when the volume rendering is performed from the sight line directions. In other words, a focus position of a parallax image group can be changed by changing sight line directions.

Then, the controller 135 of the workstation 130 changes a focus (intersection of the sight line directions) in accordance with the distance between the terminal device 140 and the subject P. For example, as the distance between the terminal device 140 and the subject P is longer, the controller 135 controls the rendering processor 136 so as to move a focus in a direction of being farther from a user (observer) and perform the rendering processing. On the other hand, as the distance between the terminal device 140 and the subject P is shorter, the controller 135 controls the rendering processor 136 so as to move a focus in a direction of being closer to a user (observer) and perform the rendering processing. In this example, as the terminal device 140 is moved in a direction of being farther from the subject P, the terminal device 140 displays a stereoscopic image on which a focus is located at a position farther from a user (observer). On the other hand, as the terminal device 140 is moved in a direction of being closer to the subject P, the terminal device 140 displays a stereoscopic image on which a focus is located at a position closer to the user (observer).

Rotation of Stereoscopic Image

Furthermore, the terminal device 140 in the above-described first embodiment may rotate and display a stereoscopic image when the terminal device 140 itself is swung in a state where the stereoscopic image is displayed on the stereoscopic display monitor 142. This point is described in detail with reference to FIG. 17. When the terminal device 140 is swung as illustrated in an upper portion of FIG. 17, the terminal device 140 may rotate a stereoscopic image that is displayed on the stereoscopic display monitor 142 as illustrated in a lower portion of FIG. 17.

In order to realize the rotation display as described above, the image storage device 120 has parallax image groups of the entire circumference that have been rendered from a plurality of viewpoint positions. Note that the viewpoint positions are arranged in a circular-arc form about the volume data VD10 as a center at a predetermined angle (for example, one degree). Then, the terminal device 140 acquires a parallax image group to be displayed from the image storage device 120 in accordance with a swinging operation so as to display the parallax image group on the stereoscopic display monitor 142. Alternatively, a configuration in which the terminal device 140 has parallax image groups of the entire circumference, selects a parallax image to be displayed from the parallax image groups of the entire circumference in accordance with a swinging operation, and displays the selected parallax image group on the stereoscopic display monitor 142 may be employed.

It is to be noted that in the above example, the terminal device 140 may have an acceleration sensor. In such a case, the terminal device 140 may detect a swinging direction and a swinging speed with the acceleration sensor, determine a rotation direction of a stereoscopic image in accordance with the detected swinging direction, and determine a rotation amount of the stereoscopic image in accordance with the detected swinging speed.

Suppression of Display Variation

Figure 18:
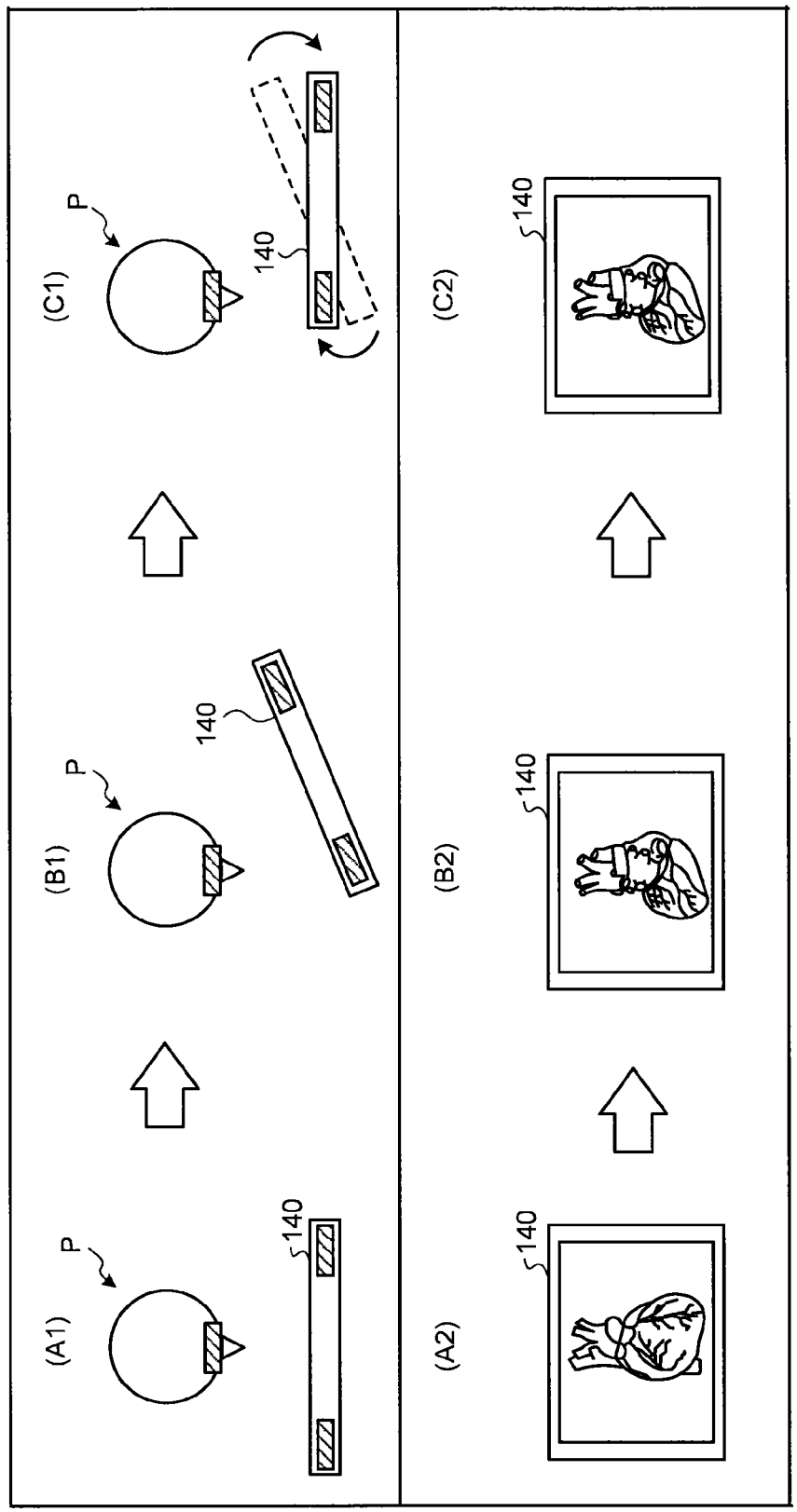
FIG. 18 is a view for explaining still another modification of the first embodiment.

Furthermore, when the terminal device 140 in the above-described first embodiment is not moved and is rotated only, the terminal device 140 may not change a stereoscopic image that is displayed on the stereoscopic display monitor 142. This point is described in detail with reference to FIG. 18. FIG. 18(A1) illustrates a state where a reference position of the terminal device 140 is set. FIG. 18(A2) illustrates a stereoscopic image that is displayed on the stereoscopic display monitor 142 of the terminal device 140 located at the reference position.

In this case, when the terminal device 140 is moved as illustrated in FIG. 18(B1), a stereoscopic image of a subject P corresponding to a held position is displayed as described with reference to FIG. 11 and FIG. 12 (see, FIG. 18(B2)). When the terminal device 140 is operated rotationally about a gravity center only such that the gravity center position of the terminal device 140 does not vary as illustrated in FIG. 18(C1), a stereoscopic image as illustrated in FIG. 18(B2) may be kept to be displayed without changing the stereoscopic image that is displayed on the stereoscopic display monitor 142, as illustrated in FIG. 18(C2). Therefore, a user can observe a stereoscopic image on a side surface of the subject P while the user himself is not required to be moved.

Pattern Matching

Furthermore, in the above-described first embodiment, the terminal device 140 receives an operation of setting a reference position so as to acquire a movement vector of the terminal device 140 based on positional information that is detected by the position sensor 145. Then, the workstation 130 sets a reference position on the volume data VD10 and generates a parallax image group of the subject P that corresponds to a position over which the terminal device 140 is held based on the movement vector of the terminal device 140. However, processing of acquiring a positional relationship between the terminal device 140 and the subject P is not limited to the example. For example, the terminal device 140 in the first embodiment may not receive the operation of setting a reference position and may not have the position sensor 145.

To be more specific, the terminal device 140 has a camera that can shoot the subject P. When a predetermined operation is performed in a state where the terminal device 140 is held over the subject P, the camera is made to shoot the subject P. Then, the acquiring unit 1462 of the terminal device 140 specifies a position that an image shot by the camera in the scanogram image A10 indicates using a region growing method or a pattern matching method with a shape template. That is to say, the terminal device 140 specifies a position of the subject P over which the terminal device 140 is held by matching contours of the scanogram image A10 and the shot image with each other using the pattern matching method. Then, the terminal device 140 transmits the specified position of the subject P to the workstation 130 so as to acquire a parallax image group of the subject P that corresponds to the position from the workstation 130. With this, the terminal device 140 can display a stereoscopic image of the subject P that corresponds to the held position on the stereoscopic display monitor 142. It is to be noted that when a position of the subject P over which the terminal device 140 is held is specified using the pattern matching method, the terminal device 140 may not have the above-described initial setting unit 1461.

Two-Dimensional Image

When the terminal device 140 in the above-described first embodiment is held over a subject P, the terminal device 140 displays a parallax image group of a site (organ or the like) corresponding to the held position so as to provide a stereoscopic image of the organ or the like to a user. However, the terminal device 140 may display a two-dimensional image (for example, CT image, MPR image, or the like) without displaying a parallax image group. That is to say, the terminal device 140 in the above-described first embodiment displays a parallax image group generated from volume data by the workstation 130. However, the terminal device 140 may display a two-dimensional image that is generated from volume data by the workstation 130. In such a case, when the workstation 130 receives a movement vector of the terminal device 140, the workstation 130 generates a two-dimensional image that is generated from the volume data and transmits the generated two-dimensional image to the terminal device 140.

Even when the terminal device 140 displays the two-dimensional image of the subject P corresponding to the held position as described above, the terminal device 140 may change a display format of a stereoscopic image that is displayed on the stereoscopic display monitor 142 in accordance with the distance between the terminal device 140 and the subject P. For example, the terminal device 140 may change a scale of the two-dimensional image in accordance with the distance between the terminal device 140 and the subject P in the same manner as the example as illustrated in FIG. 16.

Furthermore, for example, when the terminal device 140 displays a two-dimensional image, the terminal device 140 may change a two-dimensional cross-sectional image to be displayed in accordance with a distance between the terminal device 140 and the subject P. To be more specific, the terminal device 140 transmits a movement vector of the terminal device 140 to the workstation 130. As the distance between the terminal device 140 and the subject P is longer, the controller 135 of the workstation 130 generates a cross-sectional image of a site in the subject P that is closer to the terminal device 140 based on the movement vector of the terminal device 140. On the other hand, as the distance between the terminal device 140 and the subject P is shorter, the controller 135 generates a cross-sectional image of a site in the subject P that is farther from the terminal device 140. Then, the workstation 130 transmits the generated cross-sectional image to the terminal device 140.

With this, the terminal device 140 can display a two-dimensional cross-sectional image in accordance with the distance between the terminal device 140 and the subject P. To be more specific, when the terminal device 140 is moved in a direction of being farther from the subject P, the terminal device 140 can display a cross-sectional image of a site in the subject P that is closer to the terminal device 140. On the other hand, when the terminal device 140 is moved in a direction of being closer to the subject P, the terminal device 140 can display a cross-sectional image of a site in the subject P that is farther from the terminal device 140. This point is described by using an example as illustrated in FIG. 16. For example, when the terminal device 140 is in a state as illustrated in FIG. 16(A1), the terminal device 140 displays a cross-sectional image of a heart of the subject P. At this time, when the terminal device 140 is moved in a direction of being farther from the subject P as illustrated in FIG. 16(B1), the terminal device 140 displays a cross-sectional image of a site (for example, sternum or the like) in the subject P that is closer to the terminal device 140 relative to the heart displayed in the state as illustrated in FIG. 16(A1). On the other hand, when the terminal device 140 is moved in a direction of being closer to the subject P, the terminal device 140 displays a cross-sectional image of a site (for example, backbone or the like) in the subject P that is farther from the terminal device 140 relative to the heart displayed in the state as illustrated in FIG. 16(A1).

Furthermore, in the above-described first embodiment, the terminal device 140 is assumed to be a portable terminal such as a tablet-type PC. However, an embodiment of the terminal device 140 is not limited thereto. For example, the terminal device 140 in the first embodiment may be secured by a movable arm or the like that can move the terminal device 140 in the up, down, left, and right directions.

Second Embodiment

In the above-described first embodiment, an example in which a display format of a stereoscopic image to be displayed on the stereoscopic display monitor 142 of the terminal device 140 is changed in accordance with a positional relationship between the terminal device 140 and the subject P has been described. In the second embodiment, an example in which a display format of a stereoscopic image to be displayed on the stereoscopic display monitor 142 is changed in accordance with a positional relationship between a terminal device and a user (observer) is described.

Figure 19:
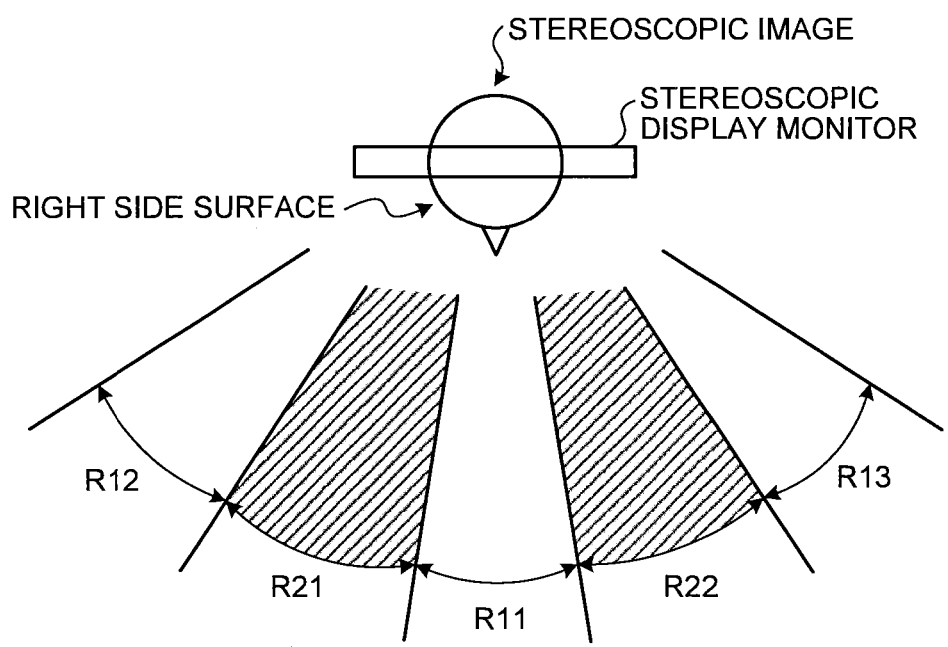
FIG. 19 is a view for explaining a relationship between a stereoscopic image and an observation position.

First, a stereoscopic image to be displayed on a stereoscopic display monitor is described with reference to FIG. 19 before an image processing system in the second embodiment is described. FIG. 19 is a view for explaining a relationship between a stereoscopic image and an observation position. In an example as illustrated in FIG. 19, the stereoscopic display monitor displays a stereoscopic image that can be viewed stereoscopically by an observer. An observation position at which a stereoscopic image is easy to be recognized visually by the observer is determined to be a predetermined region. In general, when the observation position is located at the front of the stereoscopic display monitor or at positions oblique to the front by 45°, the observer is easy to recognize a stereoscopic image visually stereoscopically in many cases. For example, in the example as illustrated in FIG. 19, when the observer observes the stereoscopic display monitor from a region R11, R12, or R13, the observer is easy to recognize the stereoscopic image visually stereoscopically. However, when the observer observes the stereoscopic display monitor from a region R21 or R22, the observer is difficult to recognize the stereoscopic image visually stereoscopically in some cases.

In this example, the observer is difficult to recognize a right side surface of the stereoscopic image visually stereoscopically from the region R21.

Then, in the terminal device in the second embodiment, a direction of the stereoscopic display monitor is changed and a stereoscopic image is rotated to be displayed in accordance with an observation position of an observer. Hereinafter, a terminal device 240 in the second embodiment is described in detail.

Figure 20:
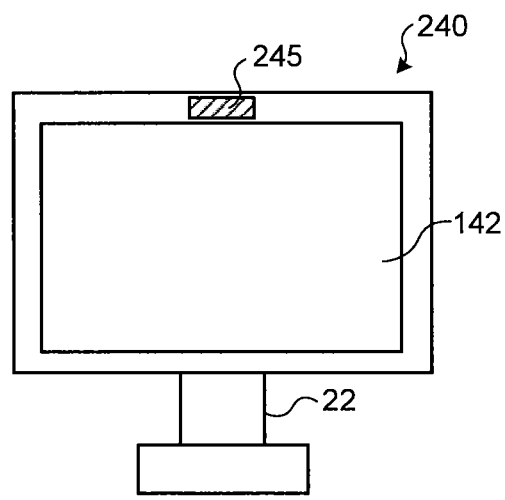
FIG. 20 is a view illustrating an appearance of a terminal device according to a second embodiment.

First, an appearance of the terminal device 240 in the second embodiment is described with reference to FIG. 20. FIG. 20 is a view illustrating the appearance of the terminal device 240 in the second embodiment. As illustrated in FIG. 20, the terminal device 240 has a rotating portion 22 and a position sensor 245. The rotating portion 22 can rotate together with the stereoscopic display monitor 142. The position sensor 245 can acquire a position of a user (observer).

Figure 21:
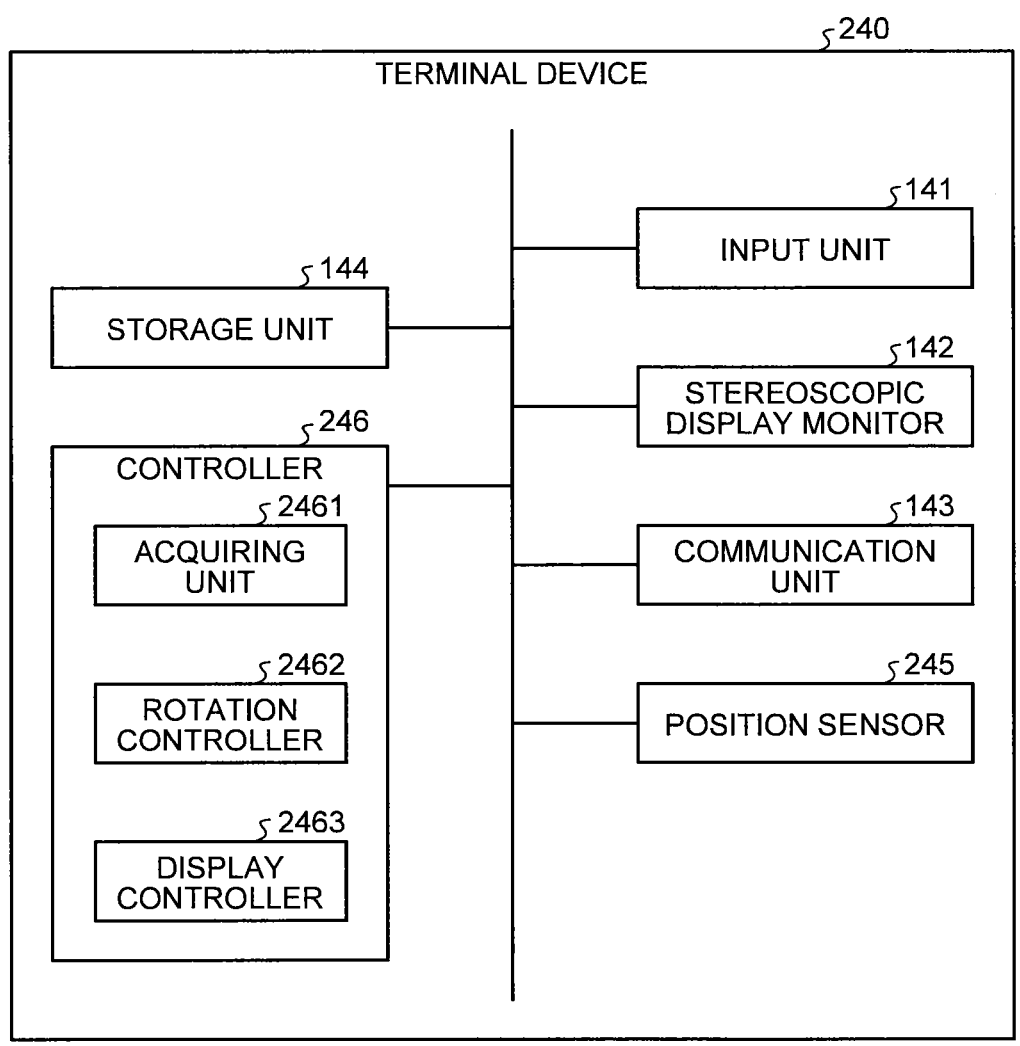
FIG. 21 is a diagram for explaining a configuration example of the terminal device in the second embodiment.

Next, a configuration example of the terminal device 240 in the second embodiment as illustrated in FIG. 20 is described. FIG. 21 is a diagram for explaining the configuration example of the terminal device 240 in the second embodiment. The terminal device 240 as illustrated in FIG. 21 corresponds to the terminal device 140 as illustrated in FIG. 1. Hereinafter, the same reference numerals denote parts having the same functions as constituent parts that have been already described, and detail description thereof is omitted. As illustrated in FIG. 21, the terminal device 240 in the second embodiment has the position sensor 245, and a controller 246.

As illustrated in FIG. 20, the position sensor 245 is provided on the stereoscopic display monitor 142. The position sensor 245 acquires an observation position as a relative position of an observer who observes the stereoscopic display monitor 142 relative to the terminal device 240.

The controller 246 is an electronic circuit such as a CPU, an MPU and a GPU, and an integrated circuit such as an ASIC and an FPGA, and controls the terminal device 240 entirely. The controller 246 includes an acquiring unit 2461, a rotation controller 2462, and a display controller 2463.

The acquiring unit 2461 acquires an angle formed by a predetermined reference direction and a sight line direction of the observer to the stereoscopic display monitor 142 (straight line connecting the terminal device 240 and the observation position) based on the observation position acquired by the position sensor 245. It is to be noted that in the second embodiment, the predetermined reference direction corresponds to a direction (depth direction, z direction) perpendicular to a display surface of the stereoscopic display monitor 142. Hereinafter, an angle formed by the reference direction and the sight line direction is referred to as "observation angle" in some cases.

Furthermore, the acquiring unit 2461 acquires a parallax image group corresponding to the sight line direction to the stereoscopic display monitor 142 from the observation position acquired by the position sensor 245 from the workstation 130. To be more specific, the acquiring unit 2461 transmits the observation angle to the workstation 130 so as to acquire the parallax image group corresponding to the sight line direction. This point will be described later.

The rotation controller 2462 rotates the rotating portion 22 such that a display surface of the stereoscopic display monitor 142 directs to the observation position based on the observation angle acquired by the acquiring unit 2461. To be more specific, the rotation controller 2462 rotates the rotating portion 22 such that the sight line direction to the stereoscopic display monitor 142 from the observation position and the display surface of the stereoscopic display monitor 142 are perpendicular (opposed) to each other.

The display controller 2463 displays the parallax image group received from the workstation 130 on the stereoscopic display monitor 142. Furthermore, when the parallax image group has been acquired from the workstation 130 by the acquiring unit 2461, the display controller 2463 in the second embodiment displays the parallax image group on the stereoscopic display monitor 142.

Figure 22:
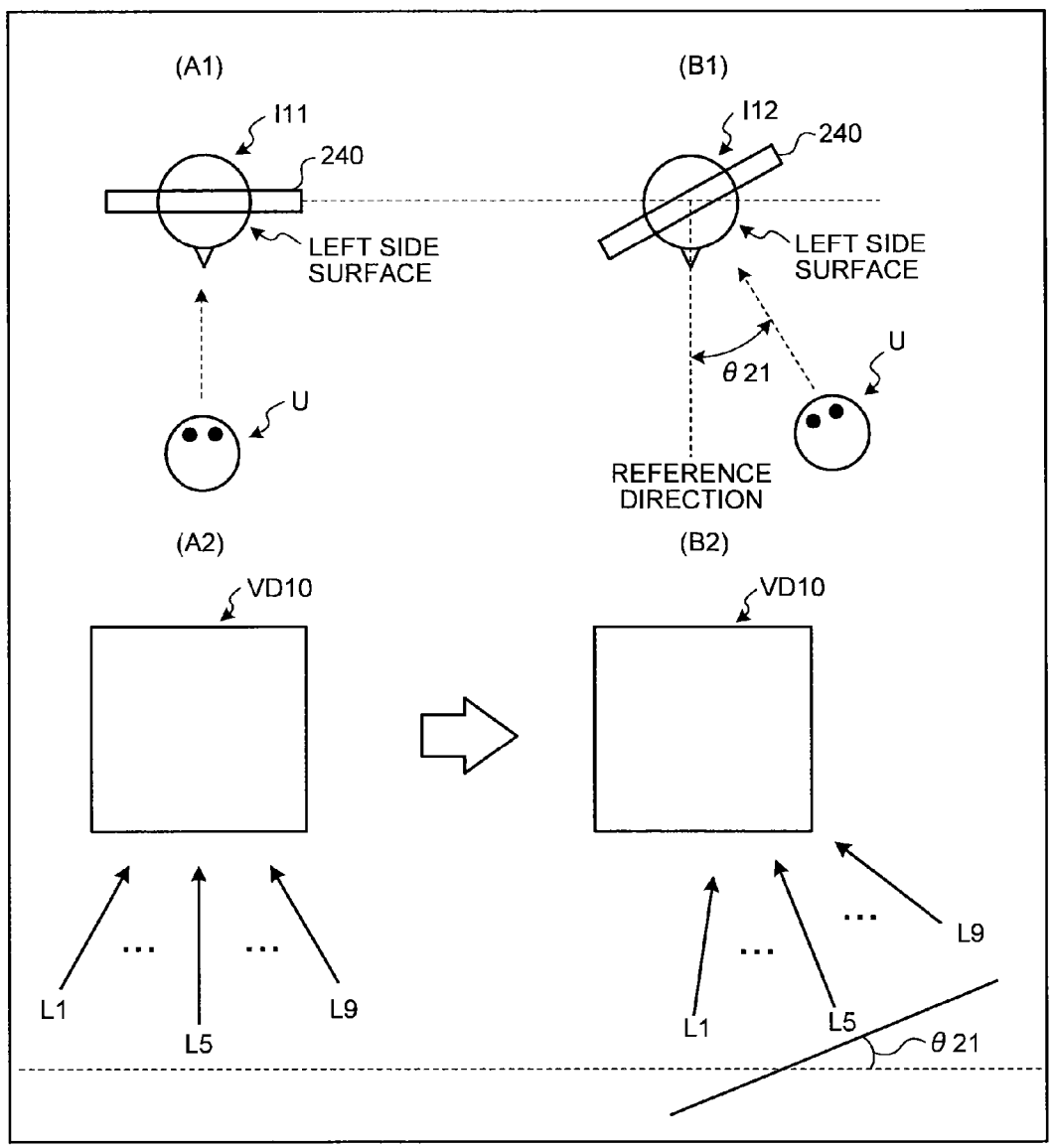
FIG. 22 is a view for explaining an example of processing by the terminal device in the second embodiment.

An example of processing by the acquiring unit 2461, the rotation controller 2462, and the display controller 2463 in the second embodiment is described with reference to FIG. 22. FIG. 22 is a view for explaining an example of the processing by the terminal device 240 in the second embodiment.

In the example as illustrated in FIG. 22, an observer U observes a stereoscopic image I11 that is displayed on the stereoscopic display monitor 142. In such a case, the position sensor 245 of the terminal device 240 acquires a position of the observer U relative to the terminal device 240 as an observation position. In an example as illustrated in FIG. 22(A1), the observer U is located at the front of the stereoscopic display monitor 142. Therefore, the rotation controller 2462 of the terminal device 240 performs no processing in that case. It is assumed that the stereoscopic display monitor 142 displays a parallax image group generated when the rendering processing is performed with sight line directions L1, . . . , L5, . . . , L9 as illustrated in FIG. 22(A2).

Subsequently, as illustrated in the example of FIG. 22(B1), the observer U is assumed to move to a diagonally left forward position of the stereoscopic display monitor 142. That is to say, it is considered that the observer U desires to recognize a left side surface of the stereoscopic image I11 visually stereoscopically.

In such a case, the acquiring unit 2461 acquires an observation angle θ21 formed by a reference direction and a sight line direction based on an observation position of the observer U that has been acquired by the position sensor 245. Then, the acquiring unit 2461 transmits the observation position and the observation angle θ21 to the workstation 130. The controller 135 of the workstation 130 that has received the observation position and the observation angle θ21 sets a viewpoint position at the time of the rendering processing to the observation position received from the terminal device 240 and inclines the sight line direction L1 and the like from the viewpoint position by the observation angle θ21, as illustrated in FIG. 22(B2). The controller 135 controls the rendering processor 136 so as to perform the rendering processing under these rendering conditions. Then, the workstation 130 transmits a parallax image group generated by the rendering processor 136 to the terminal device 240.

Then, the rotation controller 2462 of the terminal device 240 rotates the rotating portion 22 by the observation angle θ21 such that the display surface of the stereoscopic display monitor 142 is opposed to the observer U rightly based on the observation angle θ21 acquired by the acquiring unit 2461, as illustrated in FIG. 22(B1).

Furthermore, the display controller 2463 of the terminal device 240 displays the parallax image group received from the workstation 130 on the stereoscopic display monitor 142 so as to provide a stereoscopic image 112 to the observer U, as illustrated in FIG. 22(B1). That is to say, when the stereoscopic display monitor 142 is observed from the front, the stereoscopic display monitor 142 displays the stereoscopic image 112 corresponding to the left side surface of the stereoscopic image I11. As illustrated in FIG. 22(B1), the observer U observes the stereoscopic display monitor 142 from the front. Therefore, the observer U can recognize the stereoscopic image 112 visually stereoscopically, and can feel that the observer U recognizes the stereoscopic image I11 visually from a direction to which the observer U has moved.

In the above description with reference to FIG. 22, the rotation controller 2462 rotates the rotating portion 22 by the observation angle θ21 so as to make the stereoscopic display monitor 142 be opposed to the observer. However, the rotation controller 2462 may not rotate the rotating portion 22 by the observation angle θ21. To be more specific, as described with reference to FIG. 19, when the stereoscopic display monitor 142 and the observer are not opposed to each other, regions from which the observer is easy to recognize the stereoscopic image visually stereoscopically are present. Therefore, it is sufficient that the rotation controller 2462 rotates the rotating portion 22 such that the observer is located in the regions (for example, region R11 as illustrated in FIG. 19).

Figure 23:
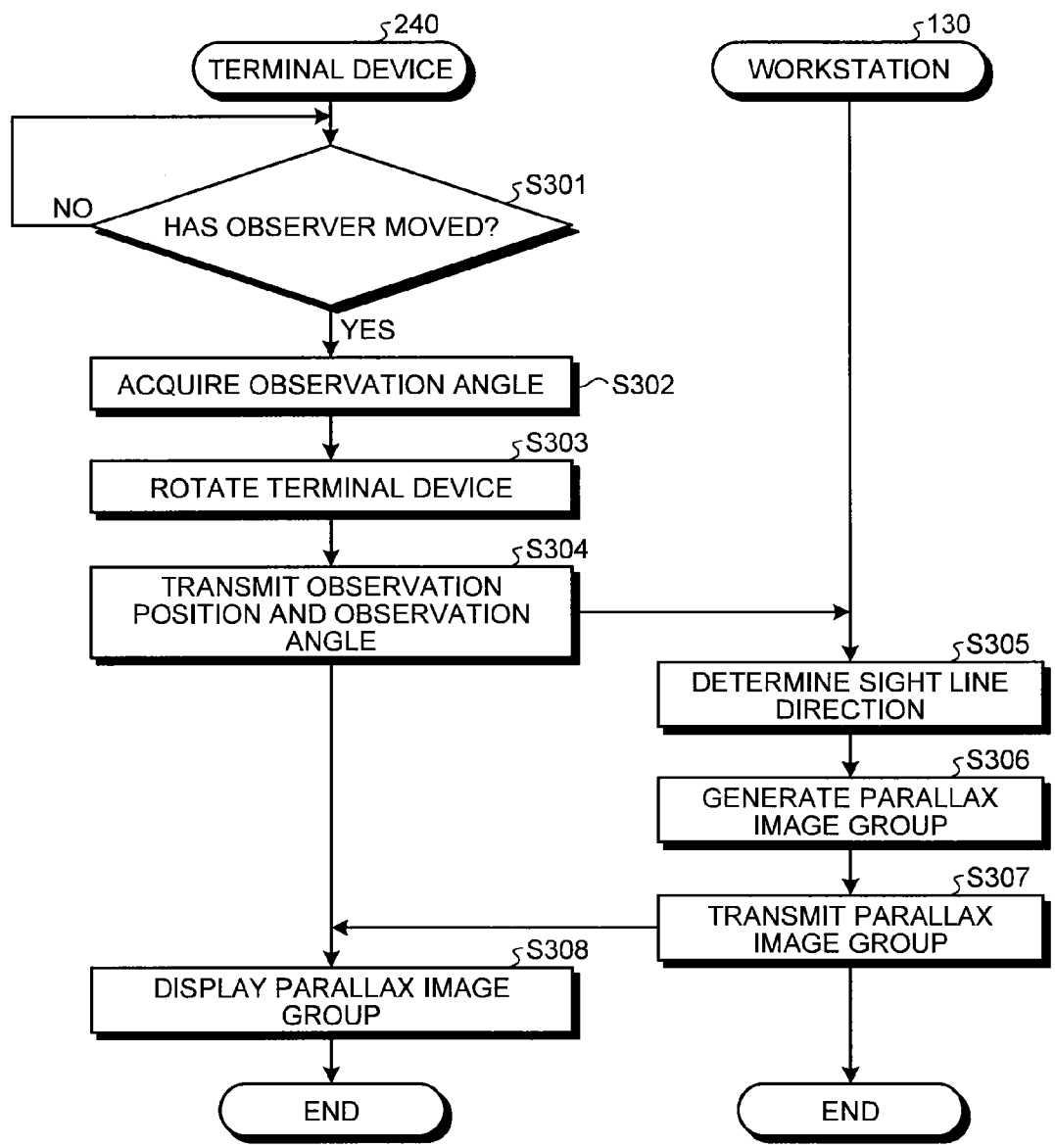
FIG. 23 is a sequence diagram illustrating an example of a processing flow by an image processing system in the second embodiment.

Next, an example of a processing flow by the workstation 130 and the terminal device 240 in the second embodiment is described with reference to FIG. 23. FIG. 23 is a sequence diagram illustrating the example of the processing flow by the image processing system in the second embodiment.

As illustrated in FIG. 23, the acquiring unit 2461 of the terminal device 240 determines whether an observer has moved based on positional information that is detected by the position sensor 245 (S301). When it has not been detected that the observer has moved (S301: No), the terminal device 240 is made into a stand-by state.

On the other hand, when it has been detected that the observer has moved (S301: Yes), the acquiring unit 2461 acquires an observation angle based on an observation position of the observer that has been acquired by the position sensor 245 (S302). Subsequently, the rotation controller 2462 of the terminal device 240 rotates the rotating portion 22 by the observation angle θ21 such that the display surface of the stereoscopic display monitor 142 is opposed to the observer rightly (S303). Then, the acquiring unit 2461 transmits the observation position and the observation angle to the workstation 130 (S304).

The controller 135 of the workstation 130 determines sight line directions at the time of the rendering processing based on the observation position and the observation angle that have been received from the terminal device 240 (S305). Then, the controller 135 controls the rendering processor 136 so as to perform the rendering processing with the sight line directions determined at S304. With this, the rendering processor 136 generates a parallax image group (S306). The workstation 130 transmits the generated parallax image group to the terminal device 240 (S307).

Thereafter, the display controller 2463 of the terminal device 240 displays the parallax image group received from the workstation 130 on the stereoscopic display monitor 142 (S308).

As described above, according to the second embodiment, a stereoscopic image can be displayed in accordance with an observation position of an observer, thereby displaying a stereoscopic image desired by the user.

It is to be noted that the second embodiment is not limited to the above-described embodiment, and may be an embodiment in a mode including some modifications as described below. Modifications of the second embodiment are described below.

Manual Rotation

Figure 24A:
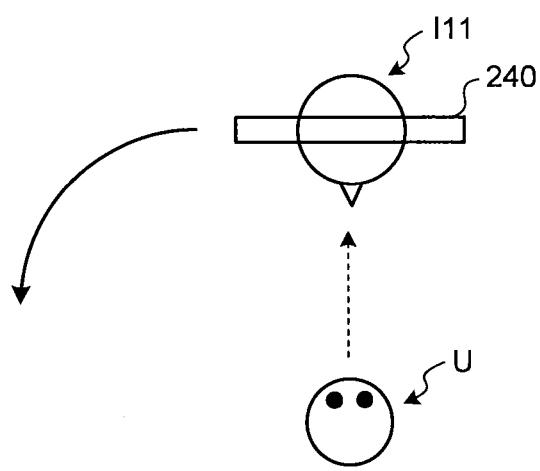
FIG. 24A and FIG. 24B are views for explaining a modification of the second embodiment.
Figure 24B:
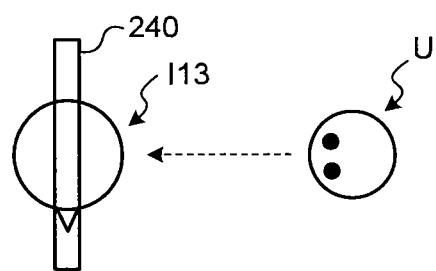

It is to be noted that in the above-described second embodiment, the terminal device 240 may be moved rotationally manually by an observer or the like. In such a case, the terminal device 240 changes a parallax image group to be displayed in accordance with a rotation amount of the device itself. This point is described in detail with reference to FIG. 24A and FIG. 24B. FIG. 24A and FIG. 24B are views for explaining the modification of the second embodiment.

In an example as illustrated in FIG. 24A and FIG. 24B, the terminal device 240 is assumed to be a mobile phone or the like in which the stereoscopic display monitor 142 and a main body are connected by the rotating portion 22 that can rotate. In the case of such a mobile phone or the like, the observer rotates the stereoscopic display monitor 142 in some cases depending on a usage mode but observes the stereoscopic display monitor 142 after the rotation from the front in many cases.

As illustrated in FIG. 24A and FIG. 24B, the stereoscopic display monitor 142 of the terminal device 240 that displays the stereoscopic image I11 is assumed to be rotated by 90°. In such a case, the terminal device 240 transmits a rotation amount "90°" of the stereoscopic display monitor 142 to the workstation 130. In this case, the controller 135 of the workstation 130 rotationally moves a viewpoint position when the parallax image group that is displayed in the state of FIG. 24A is generated by 90°, and controls the rendering processor 136 so as to perform the rendering processing from the viewpoint position.

As illustrated in FIG. 24B, the terminal device 240 displays the parallax image group generated by the rendering processor 136 in this manner on the stereoscopic display monitor 142. With this, the terminal device 240 can provide a stereoscopic image I13 corresponding to a left side surface of the stereoscopic image I11 to the observer U. As a result, since the observer U observes the stereoscopic display monitor 142 from the front, the observer U can recognize the stereoscopic image I13 visually stereoscopically. In addition, the observer U can feel that the observer U visually recognizes the stereoscopic image I11 rotated in accordance with the rotation amount of the stereoscopic display monitor 142.

Head Tracking

Furthermore, in the above-described second embodiment, the terminal device 240 has the position sensor 245 that acquires an observation position of an observer. However, a configuration in which the terminal device 240 has a camera that shoots an observer, and analyzes an image shot by the camera with a technique such as head tracking so as to acquire an observation position of the observer may be employed.

Third Embodiment

Moreover, the above-described embodiments can be varied into another embodiment. Then, in the third embodiment, the modification of the above-described embodiments is described.

Processing Entity

In the above-described embodiments, the terminal device 140 or 240 acquires a parallax image group corresponding to movement of the device itself or movement of an observation position from the workstation 130. However, the terminal device 140 or 240 may have the same function as the controller 135, the rendering processor 136, and the like of the workstation 130. In such a case, the terminal device 140 or 240 acquires volume data from the image storage device 120 so as to perform processing that is the same as that is performed by the above-described controller 135.

Furthermore, in the above-described embodiments, a configuration in which the workstation 130 does not generate a parallax image group from volume data but the medical image diagnostic device 110 has the same function as the rendering processor 136 and generates a parallax image group from the volume data may be employed. In such a case, the terminal device 140 or 240 acquires a parallax image group from the medical image diagnostic device 110.

Parallax Image Number

Furthermore, in the above-described embodiments, a figure image is superimposed on a parallax image group mainly as nine parallax images so as to be displayed. However, an embodiment is not limited thereto. For example, the workstation 130 may generate a parallax image group as two parallax images.

System Configuration

Furthermore, all of or a part of processing that have been described to be performed automatically among the pieces of processing as described in the above embodiments can be performed manually. Alternatively, all of or a part of processing that have been described to be performed manually among the pieces of processing as described in the above embodiment can be performed automatically by a known method. In addition, information including processing procedures, control procedures, specific names, and various data and parameters as described in the above-described document and drawings can be changed arbitrarily unless otherwise specified.

The constituent components of the devices as illustrated in the drawings are conceptual functionally and are not necessarily required to be configured as illustrated in the drawings physically. That is to say, specific forms of disintegration and integration of the devices are not limited to those as illustrated in the drawings, and all of or a part of them can be configured to be disintegrated or integrated functionally or physically based on an arbitrary unit depending on various loads and usage conditions. For example, the controller 135 of the workstation 130 may be connected through a network as an external device of the workstation 130.

Computer Program

Furthermore, a computer program in which processing to be executed by the terminal device 140 or 240 in the above-described embodiments is described with language that can be executed by a computer can be created. In this case, the computer executes the program so as to obtain effects as those obtained in the above-described embodiments. Furthermore, the processing that is the same as that in the above embodiment may be executed by recording the program in a computer readable recording medium and causing the computer to load and execute the program recorded in the recording medium. For example, the program is recorded in a hard disk, a flexible disk (FD), a compact disc read only memory (CD-ROM), a magnetooptic disc (MO), a digital versatile disc (DVD), a Blu-ray (registered trademark) disc, or the like. Furthermore, the program can be distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing system having a medical image diagnostic apparatus that generates three dimensional image data constituting volume data and a terminal device including a display that displays a stereoscopic image that is configured to be viewed stereoscopically using a parallax image group, the image processing system comprising:
- an image storage device configured to store the volume data generated by the medical image diagnostic apparatus;
- acquiring circuitry configured to acquire a position of the terminal device relative to a subject and a distance between the terminal device and the subject;
- a rendering processor configured to perform rendering processing on the stored volume data so as to generate a parallax image group corresponding to a region of the medical image of the subject that is opposed to the terminal device; and
- a display controller configured to cause the display to display the parallax image group generated by the rendering processor, wherein
- the rendering processor determines a viewpoint position and a sight line direction at the time of the rendering processing based on both the position and the distance acquired by the acquiring circuitry and performs the rendering processing on the volume data with the determined viewpoint position and sight line direction.

2. The image processing system according to claim 1, wherein
- the acquiring circuitry acquires a movement vector indicating positional variation of the terminal device from a predetermined reference position,
- the rendering processor determines the viewpoint position and the sight line direction based on the movement vector of the terminal device acquired by the acquiring circuitry and performs the rendering processing on the volume data with the determined viewpoint position and sight line direction so as to generate a parallax image group indicating a site of the subject that is opposed to the terminal device after being moved, and
- the display controller causes the display to display the parallax image group indicating the site of the subject that is opposed to the terminal device after being moved.

3. The image processing system according to claim 2, wherein the display controller causes the display to display a parallax image group before the terminal device is rotated when the acquiring circuitry acquires a movement vector indicating that the terminal device has been rotated at the same position.

4. The image processing system according to claim 1, further comprising shooting circuitry configured to shoot the subject, wherein
- the acquiring circuitry compares a shot image shot by the shooting circuitry with a subject image of the subject that has been shot in a wider range than the shot image so as to acquire a position of the subject shot by the shooting circuitry.

5. The image processing system according to claim 1, wherein the rendering processor generates a contracted or enlarged parallax image group in accordance with the distance between the terminal device and the subject that has been acquired by the acquiring circuitry.

6. The image processing system according to claim 1, wherein the rendering processor determines a parallax angle between parallax images constituting the parallax image group in accordance with the distance between the terminal device and the subject that has been acquired by the acquiring circuitry and performs the rendering processing on the volume data with the determined parallax angle so as to generate a parallax image group of the subject.

7. The image processing system according to claim 1, wherein the rendering processor is further configured to
- generate a cross-sectional image of a site in the subject that is closer to the terminal device as the distance between the terminal device and the subject is longer, and generates a cross-sectional image of a site in the subject that is farther from the terminal device as the distance between the terminal device and the subject is shorter, based on the position of the terminal device relative to the subject acquired by the acquiring circuitry, and
- the display controller causes the display to display a cross-sectional image generated by the rendering processor.

8. A terminal device that displays a medical image created by a medical image diagnostic apparatus that generates three dimensional image data constituting volume data and is connected to an image storage device configured to store the volume data generated by the medical image diagnostic apparatus, the terminal device comprising:
- a display configured to display a stereoscopic image that is configured to be viewed stereoscopically using a parallax image group;
- acquiring circuitry configured to acquire a position of the terminal device relative to a subject and a distance between the terminal device and the subject;
- a rendering processor configured to perform rendering processing on the stored volume data so as to generate a parallax image group corresponding to a region of the medical image of the subject that is opposed to the terminal device; and
- a display controller configured to cause the display to display the parallax image group generated by the rendering processor, wherein
- the rendering processor determines a viewpoint position and a sight line direction at the time of the rendering processing based on both the position and the distance acquired by the acquiring circuitry and performs the rendering processing on the volume data with the determined viewpoint position and sight line direction.

9. An image processing method by an image processing system having a medical image diagnostic apparatus that generates three dimensional image data constituting volume data and a terminal device including a display that displays a stereoscopic image that is configured to be viewed stereoscopically using a parallax image group, the image processing method comprising:
- storing the volume data generated by the medical image diagnostic apparatus;
- acquiring a position of the terminal device relative to a predetermined target of a subject and a distance between the terminal device and the subject;
- performing rendering processing on the stored volume data so as to generate a parallax image group corresponding to a region of the medical image of the subject that is opposed to the terminal device; and
- causing the display to display the parallax image group generated by the rendering processing, wherein
- the performing determines a viewpoint position and a sight line direction at the time of the rendering processing based on both the position and the distance acquired by the acquiring and performs the rendering processing on the volume data with the determined viewpoint position and sight line direction.

* * * * *